(12) United States Patent
Pires

(10) Patent No.: US 6,269,164 B1
(45) Date of Patent: Jul. 31, 2001

(54) METHOD OF AND SYSTEM FOR ENCRYPTING MESSAGES

(76) Inventor: Paul Pires, P.O. Box 213, Ben Lomond, CA (US) 95005

( * ) Notice: Subject to any disclaimer, the term of this patent is extended or adjusted under 35 U.S.C. 154(b) by 0 days.

(21) Appl. No.: 09/313,523

(22) Filed: May 17, 1999

(51) Int. Cl.$^7$ .................................................. H04K 1/00
(52) U.S. Cl. ........................ 380/42; 380/37; 380/268; 380/259; 380/255; 380/245; 380/44; 713/150
(58) Field of Search ................... 380/245, 255, 380/259, 268, 37, 42, 44; 713/150

(56) References Cited

U.S. PATENT DOCUMENTS 4,304,962 * 12/1981 Fracassi ............................. 178/22.12
5,222,139 * 6/1993 Takaragi et al. ....................... 380/28
6,028,939 * 2/2000 Yin ......................................... 380/49

* cited by examiner

*Primary Examiner*—Thomas R. Peeso
*Assistant Examiner*—Todd Jack
(74) *Attorney, Agent, or Firm*—Stephen C. Shour

(57) ABSTRACT

A technique for encrypting and decrypting a data message is described herein and includes a stream cipher, a block cipher and a key generation embodiment which use a process of Summary Reduction. This overall technique uses a secret key to generate ciphertext from plaintext and in doing so, the technique isolates the nature of the secret key values from the nature of the cipher text created.

39 Claims, 18 Drawing Sheets

FIG. 14 and FIG. 13 — Score table, bank by bank magnitude ranking of values, and four different arrangements of score value locations.

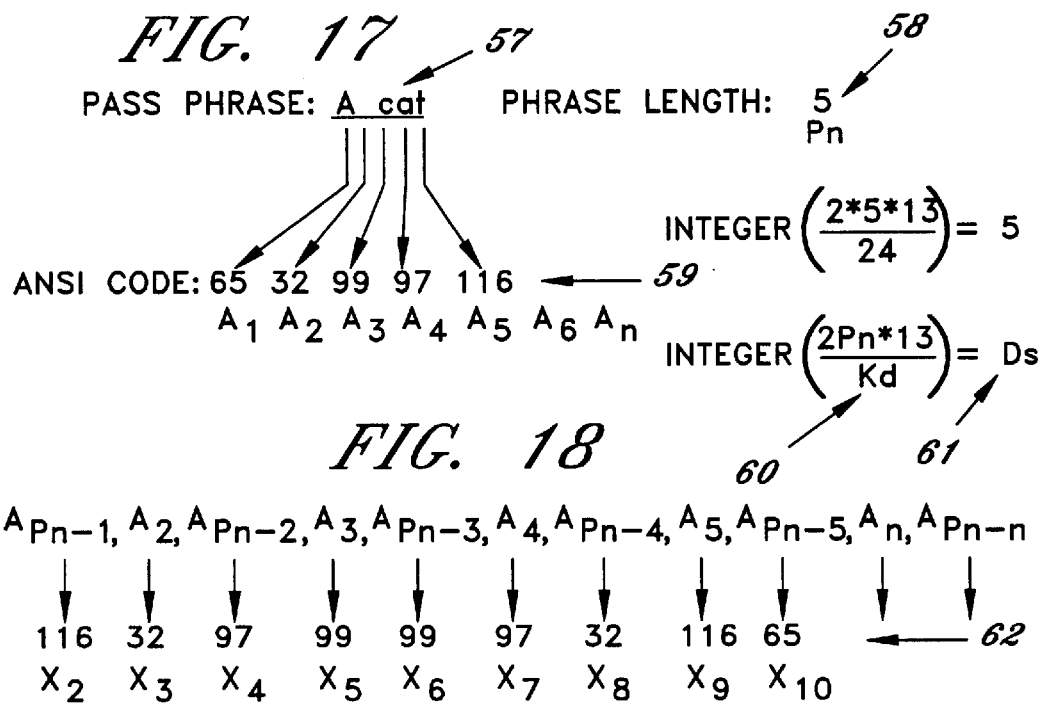
FIG. 17
FIG. 18
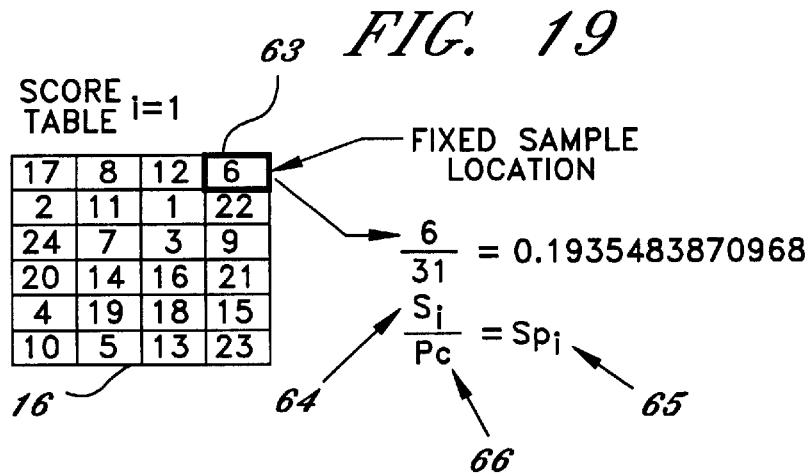
FIG. 19
FIG. 20
WHERE ii = 1
$(Sp_i + X_{ii}) * PI) = Z_{ii}$
$(0.1935483870968 + 65) * PI = 204.8115726743540$
$Z_{ii} - INTEGER(Z_{ii}) = J_{ii}$ ← 67
THIRTEEN DIGITS OF $J_1$
8115726743540 ← 68

FIG. 22

SCORE TABLE i=3

| 10 | 2  | 17 | 13 |
|----|----|----|----|
| 8  | 7  | 19 | 14 |
| 4  | 24 | 16 | 18 |
| 6  | 20 | 15 | 22 |
| 9  | 1  | 12 | 23 |
| 5  | 21 | 3  | 11 |

FIXED SAMPLE LOCATION $$\frac{13}{31} = 0.4193548387097$$

$$\frac{S_i}{P_c} = Sp_i$$

FIG. 23

WHERE ii = 2

$$(Sp_i + X_{ii}) * PI) = Z_{ii}$$

$$(0.4193548387097 + 116) * PI = 365.7421898969537$$

$$Z_{ii} - INTEGER(Z_{ii}) = J_{ii}$$

THIRTEEN DIGITS OF $J_2$

7421898969537

METHOD OF AND SYSTEM FOR ENCRYPTING MESSAGES

BACKGROUND OF THE INVENTION

This present invention relates generally to the field of cryptography and more specifically to a method of and system for producing a fast, secure stream or block cipher.

Current uses of cryptography for securing computer files, network communications, E-mail, electronic commerce and voice communications impose certain difficulties that the current art does not adequately address. Electronic media requires the standardization of the encryption methods used and also requires broad dissemination of these methods. Therefore, basing security on the secrecy of the method used is ineffective.

In the current art, the security of the encrypted message lies solely in the obscurity of the keys chosen, and is relatively unaffected by a potential adversaries knowledge of the method used. This obscurity is a difficult thing to do since the coded message or ciphertext as it is known in the art is a function, albeit complex, of the key. EK(M)=C, where E is the Encryption method, K is the key, M is the clear message and C is the ciphertext.

It is implicit in this that K, the key, can be solved for if E, M and C are known. This is bad since it should always be assumed that a message, M, can be compromised for any given C by means, other than mathematical, such as fraud, carelessness or espionage. Thus, it must be assumed that a potential intruder will have E, C and at least one M. If the Key can be solved for, all other messages encrypted with that key are compromised.

The current art addresses this problem by making the solution for K hard. In the best current methods, the solution for K is as difficult as the "Brute Force" approach discussed below. This is cold comfort since this hardness is based upon current knowledge of mathematical processes. Improvements in these processes have made ciphers, that were thought of as strong 10 years ago, suspect now in light of the new methods that have been developed. This suspicion is based upon known improvements, ones that have been published and shared. To postulate that these are the only new improvements is to say that no person or organization would keep such improvements, which they have developed, secret. This would be an optimistic view, if not down right naive.

Any cipher can be solved for by a brute force approach. This is where breaking the encryption method is ignored and every possible key is examined until one is found that solves for the plaintext. As long as the group of possible keys is large and no keys are significantly worse than others, a brute force approach is no real threat to a good key. This is because the group of possible keys can easily be large enough that computers many billions of times faster than today's machines would take more time than the life span of the universe to try a significant portion of the possible keys.

Key management is as important to security as the underlying cipher. The resistance of a cipher to a brute force attack is dependent on the size of the key space. This key space is the volume of possible keys and is a function of the key length. It is important that the secret keys selected be distributed evenly throughout this key space so that an attacker does not have a higher probability area of the key space to focus an attack on with a correspondingly higher probability of success.

Some keys are generated from pass phrases. These easily remembered groups of words and symbols are a mnemonic for the actual key used which can be quite long and garbled. Transforming these pass phrases into good keys is difficult to do well. Common phrases use only a small portion of the available characters and repeat an even smaller subset of those characters in predictable ways. A direct translation of phrase characters to key characters would produce weak keys.

BRIEF OVERVIEW OF THE STREAM CIPHER EMBODIMENT DISCLOSED HEREIN

This invention relates to the field of cryptography and more specifically to a method of producing a fast, secure stream or block cipher. In the case of stream ciphers, current art relies heavily on the use of pseudo-random number generators. These are numerical or sometimes physical constructs that produce "random" noise, which is then used to obscure the relationship between the key and the process or the enciphered message and the key or both. The ultimate example of this is the Russian "One Time Pad" method or OTP as it is known in the art. In this method, a group of randomly generated numbers is the key itself. This is a singular example in that it is the only method that can be proven to be secure. Unfortunately the constraints of the proof make the method logistically impractical as the key must be the same size as the message and each key can only be used once.

The current art seems to be based on the premise that some form of near random behavior is essential to a good cipher. This leads to a situation where an unattainable, poorly defined ideal is pursued as a condition for success. It does not logically follow that since truly random is a requirement in an OTP, that near random or pseudo-random should be ideal in another encryption method. Random is either a statement of how it was derived or an exclusive definition. No number or sequence can be proven to be random and may only be stated as having no known pattern or that it is the product of a known random process such as the decay of a radioisotope. If no number can be proven random, then surely no rational evaluation of another numbers "randomness" can be made.

The embodiments disclosed herein dispenses with the semantic difficulty stated above by defining the two requirements for secure encryption in productive terms.

The first requirement for this definitive method employs the use of a stochastic construct to generate arbitrary operators as opposed to pseudo-random operators. In this case, arbitrary operators are defined as:

A stream of numbers created such that their organization is arbitrary to any guide or pattern except the complex relationship between a method and an initial condition or "key". Furthermore, that relationship shall be limited to sequential steps of "key permutation" based solely upon arbitrary characteristics of the current key state evaluated against an arbitrary, fixed criterion. This key permutation is the repeated scrambling of the key state in one chosen way of many possible ways that are all equally weighted. The actual way chosen at each step is the result of a decision made, based upon the last change choice and the current key state. This last choice returns a new choice according to an arbitrary function of the current relative condition of the key (a score table) versus a fixed, unchanging template (a position table) to produce the current key permutation choice. This current key permutation choice is the arbitrary operator described above and a new one is produced each time the key is scrambled. Since the arrangement of the available choices are a function of the current key state derived in an arbitrary way, the arbitrary operators generated are specific to the current key state and therefore to the sequential change of the key state from its initial condition to the current configuration and nothing else.

Care must be taken to assure that the permutation behavior is arbitrary and irreversible. In the preferred embodiment the above mentioned score table is actually a ranking table of the Sums of test permutations performed on the current key. These test permutations are similar in construction and magnitude to the real change choices available (one of which the key will be scrambled to) but they are intentionally constructed so that they would make changes to the key that the actual choices could not. This is an important component of arbitrariness. The decision on how to change the key should be made by evaluating changes that cannot be made. This breaks any direct relationship between the state of the key and the change behavior, which is entirely key dependent.

Irreversibility is achieved by using the Sum of the key values of each test permutation through a process of summary reduction to be described in detail later. In the preferred embodiment, each of the test permutations is a bank of sixteen different values of some of the sixty-four different key values that are each Summed and ranked by magnitude to obtain the twenty-four scores of the score table. This ranking of Sums assures that the scores are diffuse aspects of the key condition. This diffusion is irreversible since the ranked Sums only describe the relative order of the Sums of the test permutations relative to each other and do not communicate any information about the individual values from which they are derived.

At this point, a conventional stream cipher might Exclusively OR (XOR) the binary of these operators with the binary of the plaintext characters to produce a ciphertext. Per: Applied Cryptography, second edition by Bruce Schneier, page 198, "This would be trivial to break." The arbitrary operators are the same for any key chosen. Obtaining a ciphertext and its associated plaintext and XOR-ing them together solves for the stream of operators used without needing the key. This stream could then be used to break all other ciphertexts produced with the same key. A conventional solution to this consistency problem involves something called OFB (Output Feed Back) mode. OFB mode uses some simple portion of intermediate values from combining operators and plaintext as feedback to re-seed the mechanism generating the operators. This assures different operators for different plaintexts encrypted with the same key.

The second requirement for the definitive method used in the embodiments disclosed herein is a procedural alternative to OFB. This alternative method is named Bit Shifted Exception, (BSE).

To recap, the first requirement provides a stochastic construct that repetitively scrambles a key in an arbitrary way and produces arbitrary operators that are actually the relative record of the permutation sequence the key experiences during scrambling. The arbitrary operators are found by looking up the last change choice in a fixed position table and returning the default value found in the same column/row location in the dynamic, arbitrary score table. In essence, the arbitrary operators (default values) denote the link between one key state and another. This relationship can be broken using the message in such a way that by having the key and the ciphertext, the relationship can be reconstructed as described next.

To implement BSE, the columns of the score table would be labeled according to various plaintext bit combinations. The next permutation choice would be determined by finding the value in the corresponding row from the arbitrary operator (default value) but using the column corresponding to the next plaintext bit packet. The relative shift distance that this would require from the column indicated by the arbitrary operator and the one found above would be outputted as the ciphertext message. Once this relative shift is written to the ciphertext, the key is scrambled according to this choice which is plaintext derived and relative to the key state. Doing this, the key permutation is an arbitrary progression of the key from an initial key state, in a way unique to the plaintext message. The ciphertext only has meaning relative to each, sequential, current key state. In actuality, the ciphertext becomes a temporally relative exception report on the behavior of a stochastic construct that is permuting contrary to its internal, conditional rules which are driven by sequential, diffuse and arbitrary aspects of it's initial condition.

This method can be used to produce a block cipher also and will be described in detail later in this disclosure in the description of the block cipher embodiment.

SUMMARY OF THE INVENTION

An objective of the current invention is to show a definitive method where the values of the key are not used to produce ciphertext from plaintext by some logical or mathematical function. In this method, key scrambling by choosing one way of many different ways, in an arbitrary fashion, produces the "entropy" or "randomness" used to obscure. This is done so that the nature of the secret key chosen cannot be derived from information in the plaintext and ciphertext even if the complete process used is known and understood.

A purpose of the current invention is to provide a definitive method to address the previously cited difficulties and weaknesses in the current art.

Another purpose of the current invention is to provide an encryption process that is fast and secure using simple transposition operations that do not impose large computational penalties on the processor used.

Yet another purpose of the invention is to provide an encryption process suitable for both stream and block encryption.

Still another purpose of the invention is to provide a simple, effective method to produce secure nested keys.

As will be seen in more detail hereinafter, one aspect of the present invention provides for a technique for encrypting a data message in which there is provided (i) a first position pattern of specific characters serving as an encryption key, (ii) a second position pattern of specific characters resulting from the scrambling of the characters of the first pattern, (iii) a third position pattern of specific characters resulting from the scrambling of the characters of the second pattern and (iv) a first scrambling key for determining how said second pattern results from said first pattern. This technique itself provides for a method of generating a second scrambling key for determining how said third pattern results from said second pattern, the present method comprising the steps of: (a) using said first position pattern, generating one or more arbitrary patterns of characters in a way which insures that said one or more arbitrary patterns of characters cannot be the same as said second position pattern; and (b) combining said first pattern changing input, said one or more first arbitrary patterns of characters, and a particular segment of said message in a way which produces said second scrambling key.

As will also be seen in more detail hereinafter, in accordance with another aspect of the present invention, the latter provides for a method of encrypting a data message, comprising the steps of:

(a) providing a first particular data message; (b) selecting a first position pattern changing input; (c) providing a first position pattern of specific characters, which first pattern serves as an encryption key for said data message, said specific characters in said first pattern being movable from said first pattern to a second one of other possible position patterns within a first group of possible second patterns; (d) using said first position pattern, generating one or more first arbitrary patterns of characters, said one or more first arbitrary patterns being different from any one of the patterns in said first group of possible second patterns; (e) establishing a second position pattern changing input based at least in part on (i) said first pattern changing input, (ii) said one or more first arbitrary patterns of characters, and (iii) said first message; (f) generating a first encrypted data message corresponding to said first particular data message also based at least in part on (i) said first pattern changing input, (ii) said one or more first arbitrary patterns of characters, and (iii) said first message; and (g) placing said specific characters into a second one of the position patterns of said first group of possible second position patterns, said second position pattern being based, at least in part, on (i) said second position pattern changing input, said specific characters in said second position pattern being movable from said second pattern to a third one of other possible position patterns within a second group of possible third patterns.

As will also be seen in more detail hereinafter, in accordance with still another aspect of the present invention, the latter provides for an overall method of encrypting segments of a data message in which a first position pattern of specific characters serves as an encryption key. The present invention also provides for a method of providing said first position pattern of specific characters, comprising the steps of: (a) providing a pass phrase; (b) establishing a beginning pattern of specific characters, which beginning pattern is to be made known to the encryptor and decryptor, said last-mentioned specific characters in said beginning pattern being movable from said beginning pattern to a second one of other possible position patterns within a first group of possible second patterns; (c) using said beginning position pattern, generating one or more first arbitrary patterns of characters, said one or more first arbitrary patterns being different from any one of the patterns in said last-mentioned first group of possible second patterns; (d) using said pass word and said one or more arbitrary patterns of characters, placing said specific characters from said beginning pattern into a second one of the position patterns of said last-mentioned first group of possible second position patterns, said specific: characters in said second position pattern being movable from said second pattern to a third one of other possible position patterns within a second group of possible third patterns; and (e) using the last-mentioned second position patterns, repeating steps (c) and (d) one or more times, depending on the pass word, to establish subsequent, successive position patterns until said first pattern serving as said encryption key is provided.

DESCRIPTION OF THE DRAWINGS

FIG. 7 is a similar view to FIG. 6 where the tetrahedron is exploded consistent with slides $P_{17}$–$P_{24}$.

FIG. 13 is a construction detail of item 34 found in FIG. 12.

FIG. 14 is a construction detail of item 40 found in FIG. 12.

FIG. 17 is a diagram relating to the key generator showing pass phrase variables and equations.

FIG. 18 is a diagram relating to the key generator showing code number arrangement.

FIG. 19 is a diagram relating to the key generator showing score sample reduction to $Sp_i$ value.

FIG. 20 is a diagram relating to the key generator showing digit stream generation.

FIG. 22 is a diagram representative of FIG. 19 at a later iteration.

FIG. 23 is a diagram representative of FIG. 20 at a later iteration.

BRIEF DESCRIPTION OF THE STREAM CIPHER EMBODIMENT

The following is a summary of an actual, illustrated stream cipher embodiment of the present method of encrypting a binary data message, to be processed in two bit increments, in accordance with the present invention. At the outset, this method assumes that we have at least a first plain text message to encrypt. One such message is shown in FIG.

Figure 2:
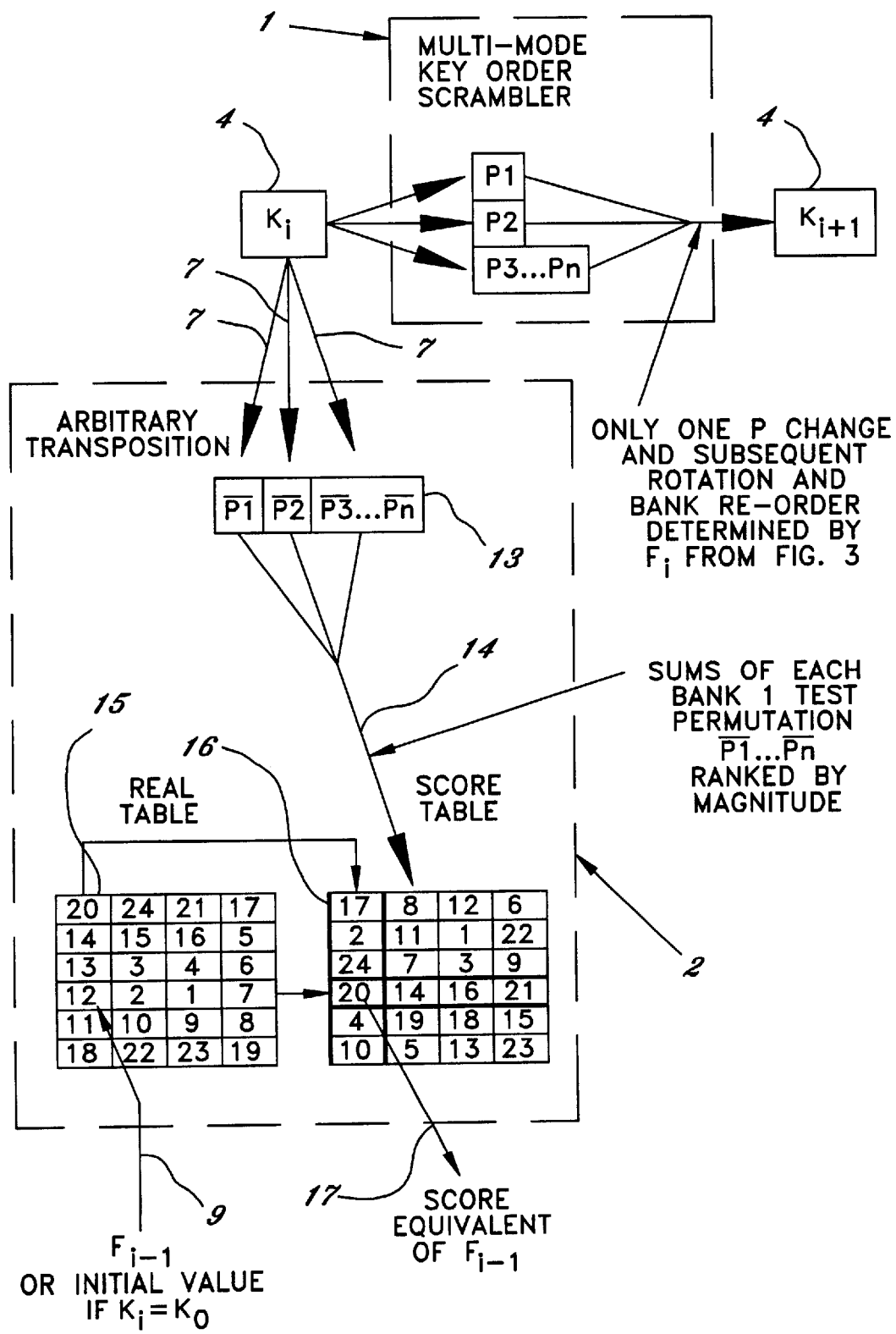
FIG. 2 is a flow chart, consistent to FIG. 1 but detailing the section referenced by the numeral 2 in FIG. 1.

3 in two-bit binary form as "11", indicated by the reference number 20 entitled Plaintext. At the same time, a first position pattern changing input 8 is provided as the last change function 9a, selected along with first position pattern of specific characters. The first position pattern changing input can be any number the user wishes to select and must be known to both parties and could be a widely known or public value. In this example, this first input or change function 9a is selected to be the number twelve, as seen in FIG. 2.

Figure 5:
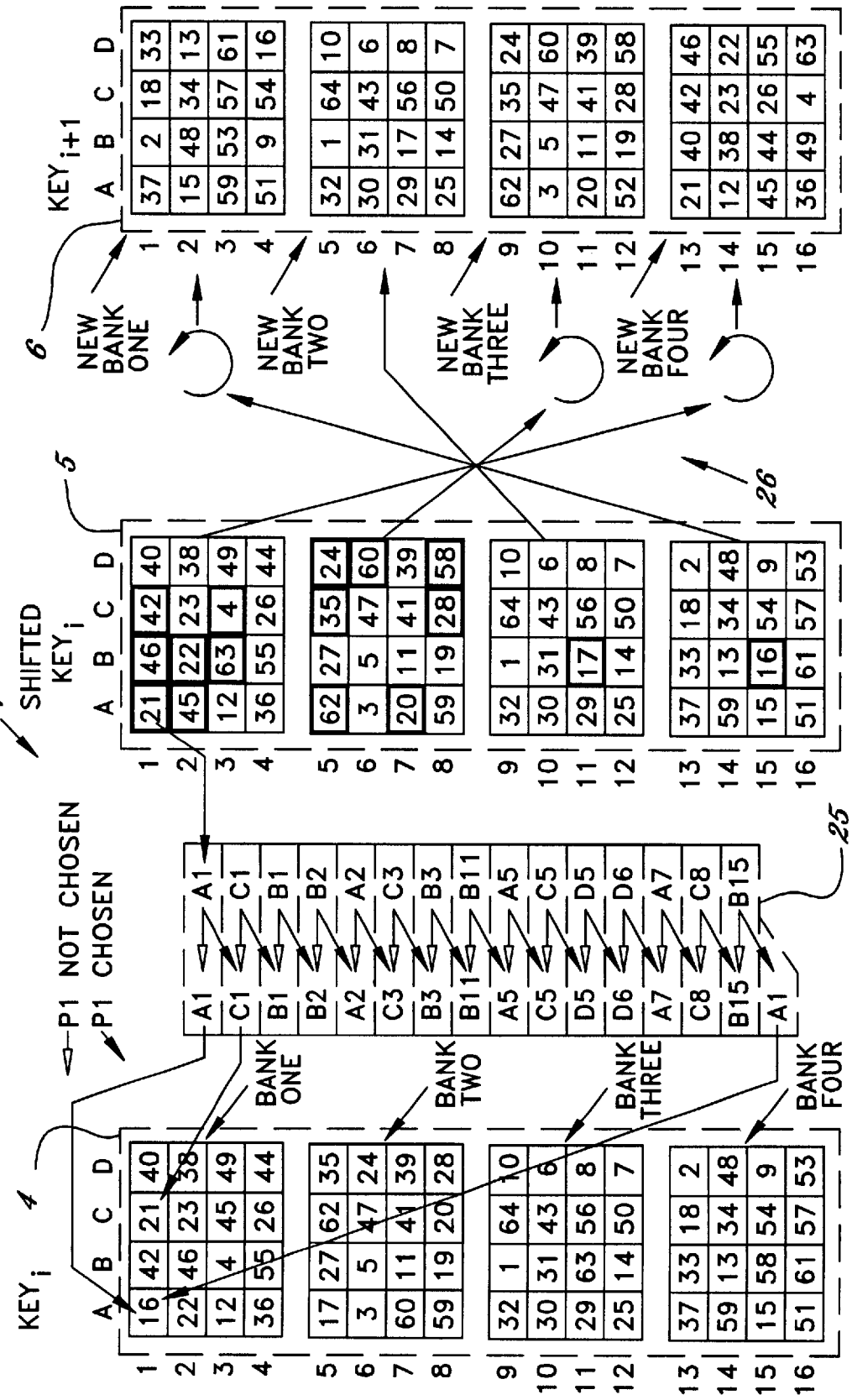
FIG. 5 is detail of the region of FIG. 1 indicated by the reference numeral 1.
Figure 6:
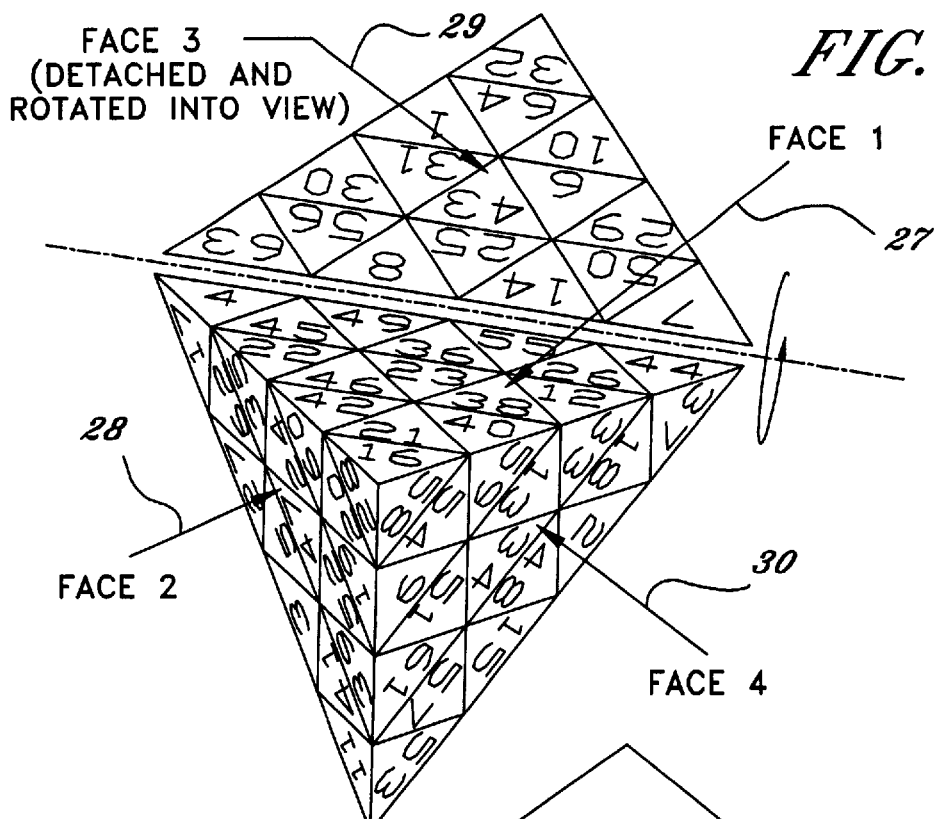
FIG. 6 is a perspective view of the tetrahedron cited with the rear face, which would normally be obscured, detached and rotated into view.

The first position pattern of specific characters is very important in that it serves as the encryption key for this particular process of encrypting and decrypting the message at hand. This pattern is obtained in accordance with a key generation technique designed in accordance with the present invention, as will be described hereinafter. For the moment, it suffices to say that this first, key pattern, which is referenced in FIG. 2 at $K_i$, is one which is changeable to a second one of other possible position patterns within a first group of possible second patterns $P_1$–$P_{24}$, also referenced in FIG. 2. The first, key pattern of specific characters $K_i$ is also shown in FIG. 5 along with a particular second pattern, in this case, $P_1$ within the group of second patterns, indicated at $K_{i+1}$ in FIGS. 2 and 5.

In the particular embodiment illustrated, the specific characters making up the key pattern move to positions in the particular second pattern in accordance with certain rules set down ahead of time. These rules can best be explained using the tetrahedron illustrated in FIGS. 6 through 9. The tetrahedron has four equal sides, each of which has an equal number of cells (positions) containing respective unique characters (numbers in this case). The four sides are represented by four banks 1–4 of 16 characters (numbers) each in FIG. 5. The four banks on the far left represent the first, key pattern $K_i$ and the banks at the far right represent the second pattern $K_{i+1}$. These characters are movable from one cell to another along the slide lines shown. There are three sets of four parallel slide lines for a total of twelve slide lines and the characters, which in accordance with this embodiment, are movable at least one and, in this case, only one cell space in either direction (+ or −), for a total of twenty-four possible moves ($P_1$–$P_{24}$). Each of the sets extends through the tetrahedron 60° from the other sets and each slide line is sufficiently long such that each slide line (actually the cells making up the slide lines) extends across all four sides of the tetrahedron so as to form a loop around the tetrahedron.

In the illustrated embodiment, the characters of any given position pattern, for example the first, key position pattern $K_i$, are moved one space along a selected slide, either forward or backward, and this movement is determined by the specific value of the position pattern changing function (The change function 9b) associated with that move. Thus, in changing from the first, key pattern $K_i$ to the second position pattern $K_{i+1}$, the second position pattern changing function is used. In our example this latter function is the number 1 appearing in Table 19 in FIG. 3. The way we arrive at that number will be discussed hereinafter. For the moment, it suffices to say that any given pattern changing function in this embodiment is a whole number between 1 and 24 and represents one of the twelve slide lines and the direction of movement along that particular slide line. For example, the function 1 selects moving characters along the slide and direction indicated by $P_1$ in FIGS. 6 through 9. Because of the way in which the tetrahedron and slide lines are designed, this movement causes the downstream most character (in terms of movement) on each side (each bank) to move to the next adjacent side (bank). Thus, in the case of present embodiment, the key value sixteen in bank 1 of the first, key pattern $K_i$ in FIG. 5 moves to bank 4 and, according to the rules of this embodiment of the present invention, this latter bank 4 becomes bank 1 in the second pattern $K_{i+1}$, as illustrated in FIG. 5. In other words, the tetrahedron then "flips" and rotates so that bank four is displayed as a new bank one and all other faces assume new identities as also directed by the change function 9b. This process of sliding and flipping continues for each successive iteration.

Before going on, there are two important things to note about the position pattern of characters and the position pattern changing functions. First, for any given pattern, the pattern of characters can change from that pattern to a next one of other possible patterns within a group of possible patterns, depending on the particular pattern changing function. As will be seen hereinafter, this latter function is, in turn, dependent on (1) the immediately preceding pattern changing input, (2) an arbitrary pattern or patterns of characters to be discussed hereinafter, and (3) the message to be sent. Because of these latter three items, the position pattern changing functions change in a way which is arbitrarily diffused or de-coupled from the way in which the position patterns of characters change. As will also be seen, all three of these latter items are used to generate an encrypted message from the plain message.

Attention is now directed to the way in which the second and subsequent position pattern changing functions are established. As indicated immediately above, in order to obtain each of these latter functions it is necessary to start with (1) the immediately preceding pattern changing input, (2) arbitrary pattern or patterns of characters, and (3) the message to be sent. The first and third ones of these items are readily available without further discussion here. It is the second item, namely the arbitrary pattern, which is to be described here and which is important to the present invention. For this discussion, we will use the embodiment illustrated, starting with the first, key pattern $K_i$ illustrated in FIG. 5, the first pattern changing input value of twelve shown in FIG. 2 and the plain text binary message "11" in FIG. 3.

In the present embodiment, we generate a plurality of arbitrary patterns $\overline{P}$ (P not) shown in FIG. 2. They are generated in the following way, using and starting with the current, key position pattern of characters $K_i$ in FIG. 5, that is, the pattern of left-hand-most banks 1–4. As stated above, in actually changing from the first position pattern Ki to the second position pattern $K_{i+1}$, the characters are moved from positions in the first pattern to positions in the second pattern by moving one of the slides one space + or − and then flipping the banks so that bank 1 always rotates and moves to one of the other three banks. In the case of these arbitrary patterns, there are twenty-four different arbitrary patterns of bank one only, one for each of the slide movements ($P_1$–$P_{24}$). More specifically, the first arbitrary bank is established by of the characters of the first, key pattern according to the first of these 24 slide movements and observing how bank 1 and only bank 1 of the first pattern changes, without flipping and rotating the banks. This changed bank 1 is the first of the 24 arbitrary patterns. This is repeated for each of the 24 slide movements until all 24 arbitrary patterns are established. It is important to note that these latter patterns by definition must be different than any of the possible patterns in the group of second patterns that the first, key pattern can actually change to since no flip and rotation takes place.

Once the twenty-four arbitrary patterns $P_1$–$P_{24}$ are generated, the value of the characters (numbers) in each pattern is Summed and these twenty-four Sums are relatively ranked by magnitude (1–24) in the twenty-four entry Score Table 16 shown in FIG. 2. Thus, in the case illustrated, the Sum of $\overline{P}1$ is ranked 17, $\overline{P}2$ is ranked 8 and so on. At the same time, a twenty-four entry Real Table (fixed and arbitrary) 15 containing the numbers 1–24 is also provided and shown in FIG. 2. Note that the initial value 12 is found in the first column (starting from the left) and the fourth row (starting from the top) of the Real Table 15. Using this position, a score equivalent value is found at the corresponding position in the Score Table which in the present embodiment is the number 20. Thus, to arrive at the score equivalent value 20 both the first pattern changing input value of 12 and the arbitrary patterns $\overline{P}_{1-24}$ were necessary.

Figure 3:
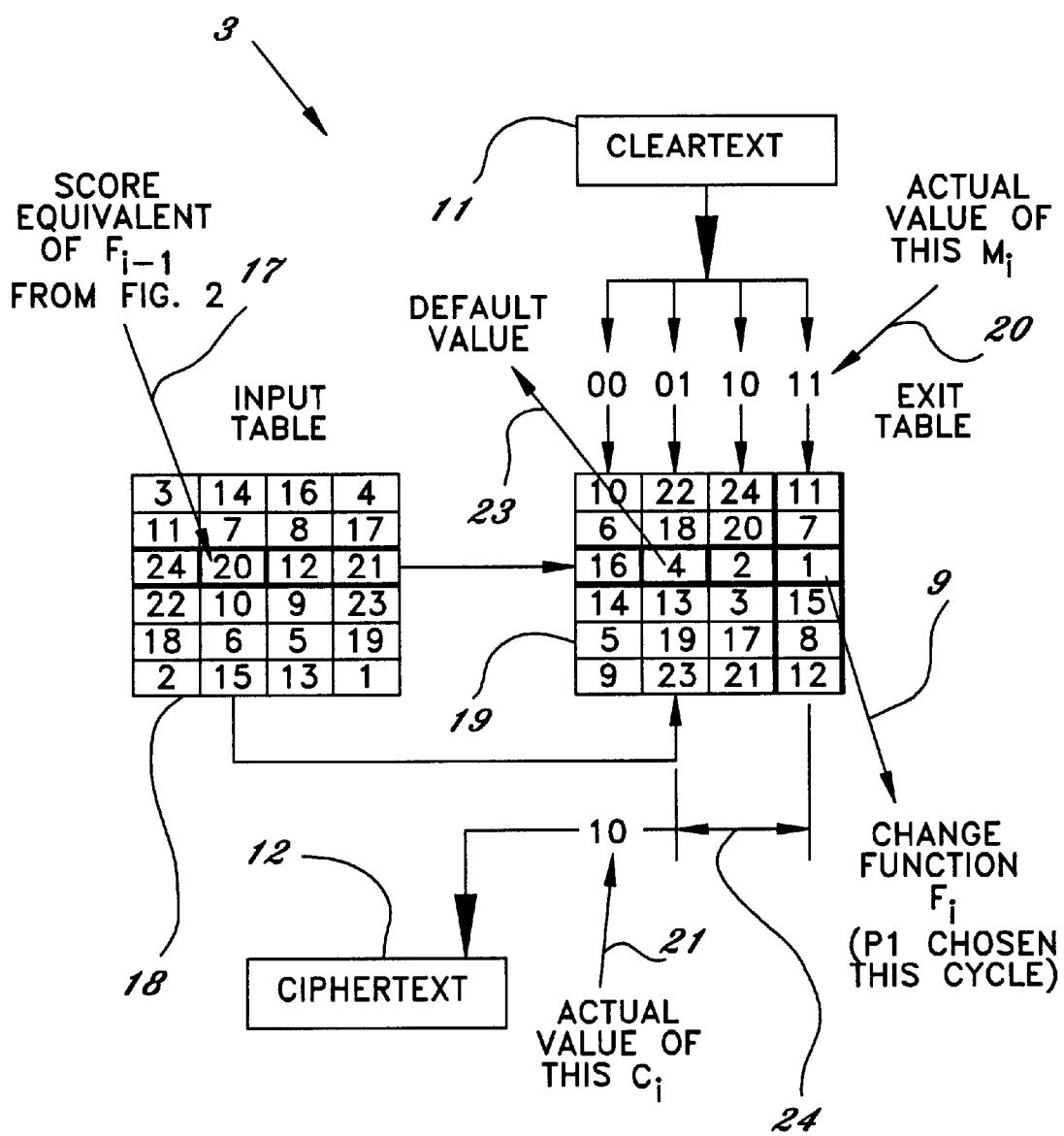
FIG. 3 is a flow chart, consistent to FIG. 1 but detailing the section referenced by the numeral 3 in FIG. 1.

Referring to FIG. 3, a second twenty-four entry Input Table (fixed and arbitrary) 18 is provided along with a third twenty-four cell Exit Table 19 (fixed and arbitrary). Note that the score equivalent value 20 is found in the second column and third row of the input table 18. This cell position is used to find the default value 4 in the corresponding position in the Exit Table. At the same time, the first binary message "11" corresponds to the entry which appears at the top of the fourth column in the Exit Table. The relationship between the cell position of the default value 4 and the column defined by the specific message provides two important bits of information simultaneously. First, it establishes the second position pattern changing function at the intersection of the row containing the default value and the column defined by the message, that is the intersection of the fourth column and the third row, resulting in the second change function value of 1. At the same time, it provides translation from plaintext to ciphertext, which is the relative value of the spacing from the messages fourth column to the default values second column, that is, a shift of two places to the left. Thus, the plaintext message "11" becomes the cipher text message "01", the binary value two.

The second position pattern changing value of 1 is now used in two ways. First, it is used to charge the first, key position pattern to the second position pattern by moving the characters one positive space along the P1 slide and then flipping and rotating the banks, as described above. Second, the position pattern changing value of 1 is used as the next input to obtain the third position pattern changing function, and so on from one position pattern to the next until all the messages (2-bits of information) are encrypted.

Detailed Description of the Preferred Stream Cipher Embodiment

Figure 1:
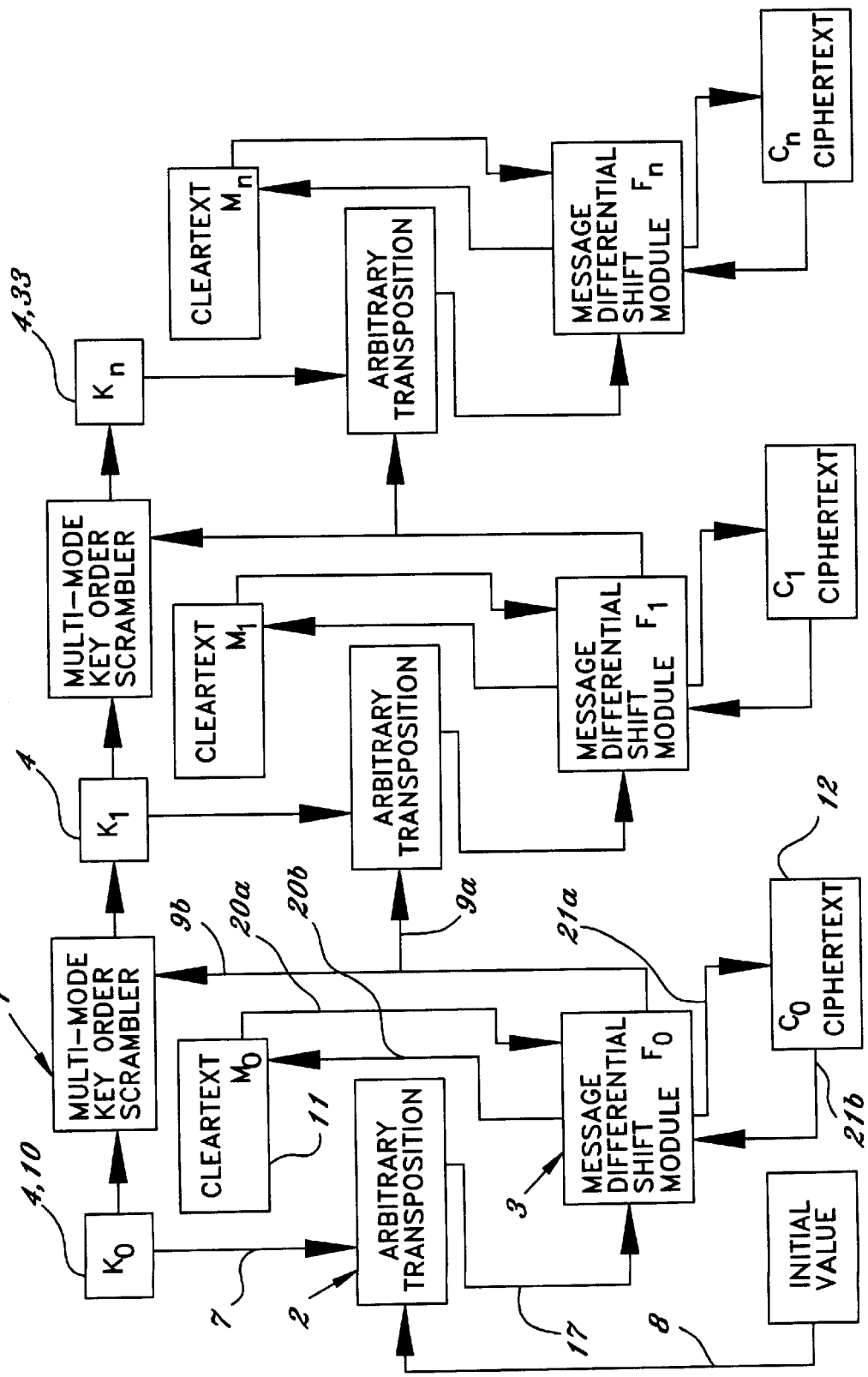
FIG. 1 is a flow chart of the general operations performed by the stream cipher embodiment.
Figure 4:
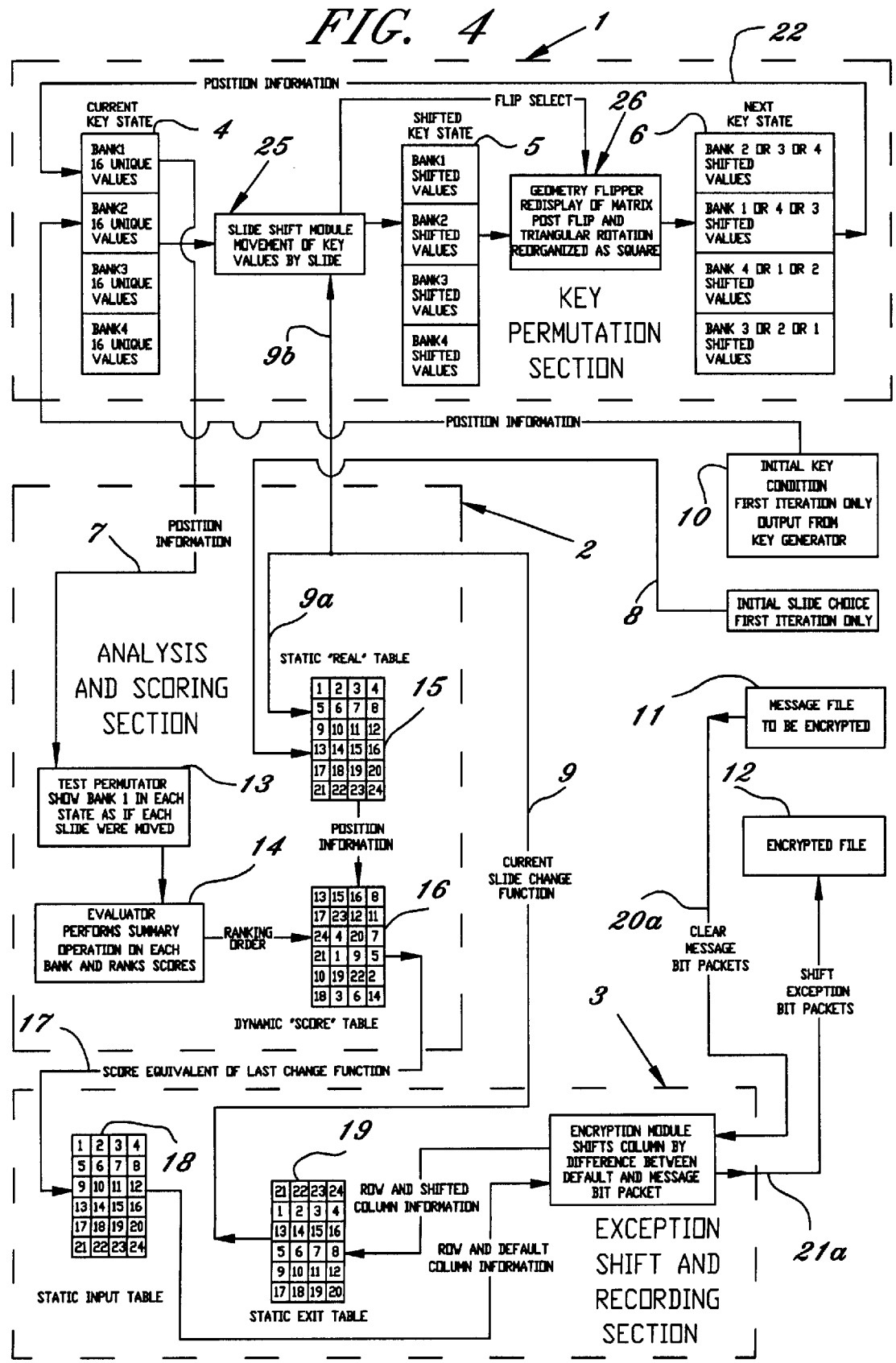
FIG. 4 is a block diagram of the stream cipher embodiments configuration.

The over-all encryption/decryption method of the invention is shown in the block diagram FIG. 4. The flow chart of FIG. 1 and it's detail FIGS. 2 & 3, show the sequence of operations of this embodiment as it processes a message 11 from its beginning, step "0", to its end, step "n". The three major sections of FIG. 4 which are, Key permutation 1, Analysis and scoring 2 and Exception shift and recording 3 will be described in turn. The key permutation section 1 is best seen in FIG. 5. A selected secret key 10, as seen in FIG. 1, which is a unique arrangement of sixty-four different values, serves as the first current key state 4. The key values 4 are subsequently shifted in one of twenty-four different ways, ($P_1$) through ($P_{24}$), where the way chosen is determined by the slide change function 9b. A description of the origin of this function 9b will be provided in the description of the subsequent sections. FIG. 5 shows the change made to the key if the slide, designated ($P_1$) 25, was selected. Cells effected by this change are shown bold. After this value shift 25 has occurred, the shifted state 5 is further modified by one of three different bank transposition and rotation operations 26 also dependent upon the chosen change function 9b. This shifted and transposed group of values, the next key state 6, is copied to the current key state position 4 to start the next encryption/decryption iteration.

Figure 7:
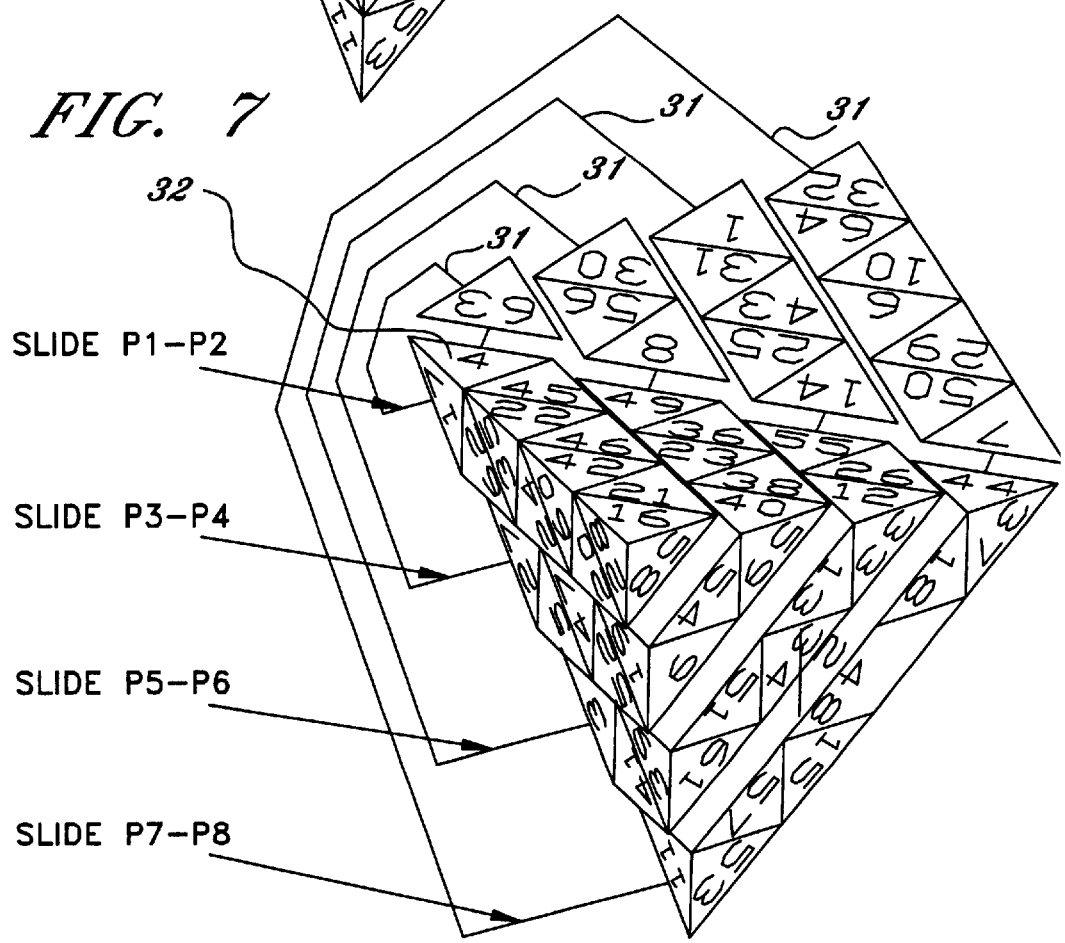
FIG. 7 is a similar view to FIG. 6 where the tetrahedron is exploded consistent with slides $P_1$–$P_8$.
Figure 8:
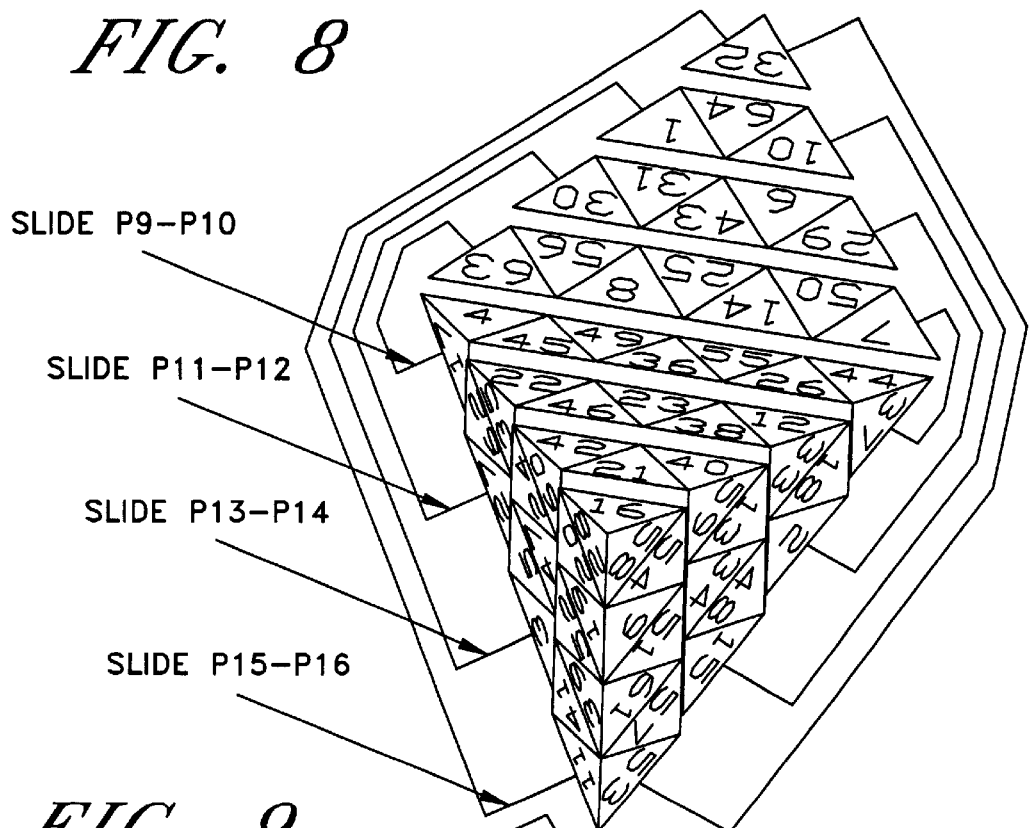
FIG. 8 is a similar view to FIG. 6 where the tetrahedron is exploded consistent with slides $P_9$–$P_{16}$.
Figure 9:
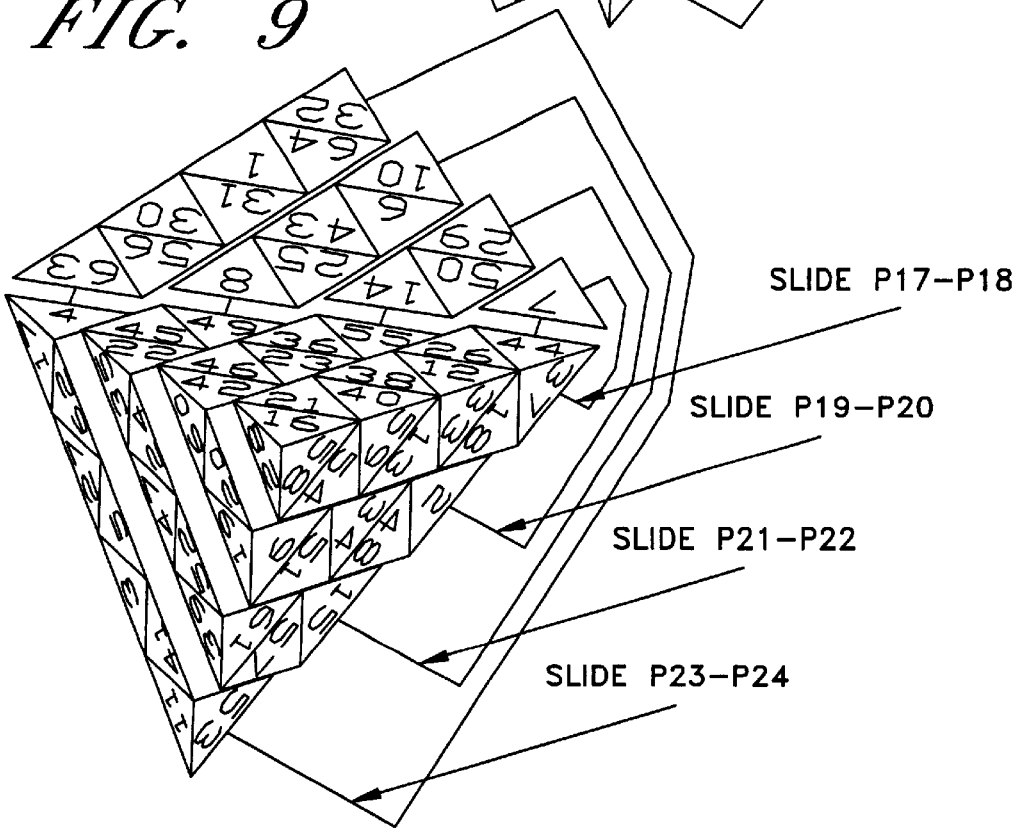

The method used, for this embodiment, to shift key values 4 and perform the rotation-transposition 26 is based upon a simple physical model of a segmented equilateral tetrahedron shown in FIGS. 6 through 9. The four banks of values, of which the key 4 is composed, are two-dimensional representations of the faces 27,28,29 &30 of this three dimensional tetrahedron. The slides are modeled after twelve slices 31 of the tetrahedron, four of which are shown in FIG. 7. Four more slices 31, FIG. 8, can be derived in a similar way by taking the slices 31 sixty degrees from the first set. As a final set, the four remaining slices 31, FIG. 9, sixty degrees from the first and second set are used. Values can be moved along these predetermined paths one place, in either direction, providing a total of twenty-four different ways ($P_1$–$P_{24}$) to shift key values 4 one place. It should be noted that each slide 31 is composed of different arrangements of sixteen value locations 32. This assures that all slides 31 have an equal change effect on the total key 4, however, each slide 31 effects different combinations of values on each face 27,28,29 &30 in different ways.

The three different rotation-transposition operations, one of which, 26, is shown in FIG. 5, are modeled on the three dimensional rotation of the tetrahedron to display one of three new faces as face one and the subsequent re-labeling of all faces. The face chosen to re-display as face one is chosen by an arbitrary rule. This rule, dictated by the change function 9b, is in this case as follows: Whichever face gains a new value from face one as a result of the previously described shift of values along a slide, becomes the new face one. In the case of FIG. 5, it is bank four. The tetrahedron of FIGS. 6 and 7 then rotates to bring this new face one to the front. FIG. 5 is merely a flat, square depiction of this three dimensional, four sided tetrahedron process.

As seen in FIGS. 1, 4 & 2, the next section, analysis and scoring 2, takes value at position information 7 about the key 4 and re-displays provisional bank ones of the key 4 as if each of the twenty-four slide shifts of 1 were to be performed. This produces twenty-four unique banks of values 13 (NOT P1–NOT P24) each containing sixteen values which are the inputs for an inventive process, herein named summary reduction.

Figure 25:
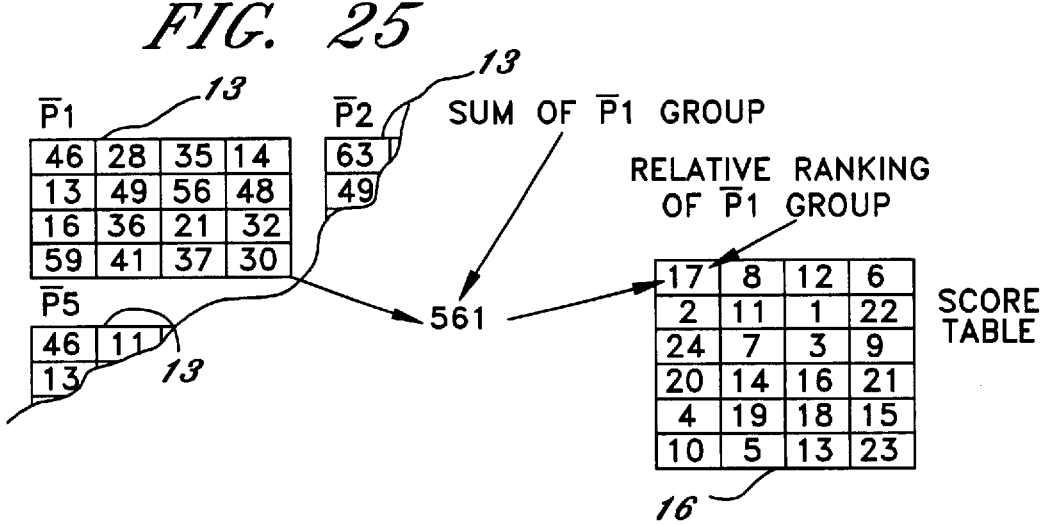
FIG. 25 is a diagram of the test permutations and score table.
Figure 26:
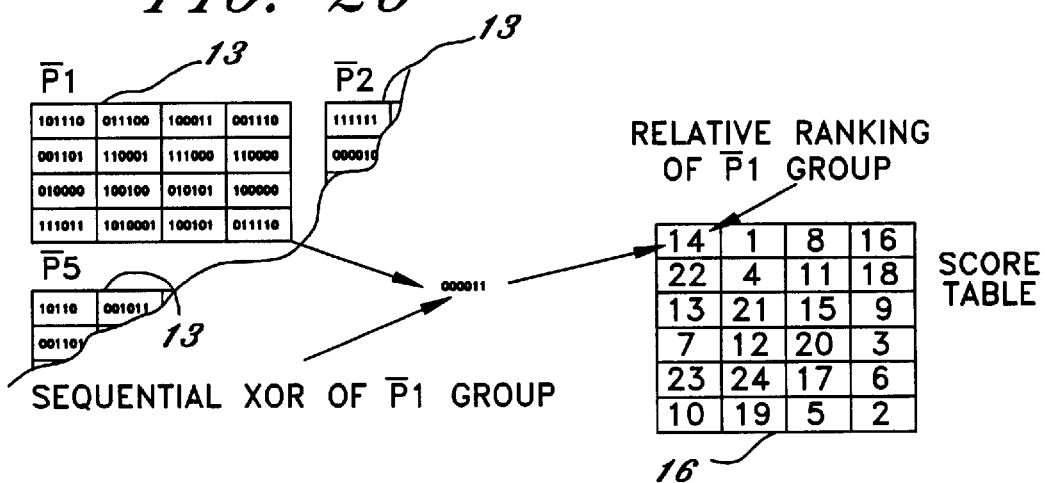
FIG. 26 is a diagram similar to FIG. 25 showing an alternate construction of the test permutations and score table.
Figure 27:
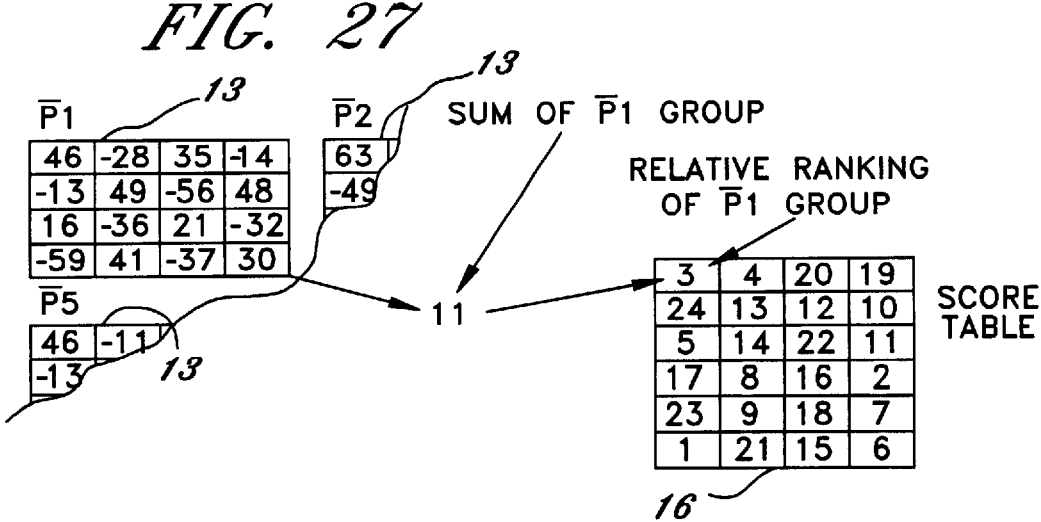
FIG. 27 is a diagram similar to FIG. 25 showing an other alternate construction of the test permutations and score table.

The process of summary reduction, shown in FIGS. 25–27, is a process deterministic in the forward direction only, which is used to make a condensed decision table, or score table, from a larger group of values. This process has two steps, abstracting and ranking. Abstracting is the process of generating one value representative of and determined by a larger group of values where the abstract value is such that it cannot convey each of the constituent values individual identities, i.e. information is lost. This can be done many ways, some of which are shown in the following examples. As seen in FIG. 25, the group of constituent values can be averaged or summed to produce a summary value, which is used as the abstract value described above. FIG. 26 shows the use of XOR on binary values. FIG. 27 shows summing alternately inverted values as a way of arriving at this abstract value.

Ranking is simply that, it is the magnitude ranking of the many abstract values, each made from many larger banks of data, to produce a table of values. This is also a one-way, deterministic process since the information contained in the actual abstract values is lost. All that is known from the ranking table is the relative ranking of the abstract values and not the values themselves.

A measure of the one-way-ness of the operation can be defined as Deterministic Leverage. This measure is the ratio of the possible different states, which might be validly represented by the possible combinations of the constituent values over the possible states of the table, which might be validly represented by the possible combinations of the table values. In the preferred embodiment disclosed, the Deterministic Leverage is $10^{35}$ (Possible Key value combinations of $10^{68}$ divided by possible score table combinations of $10^{33}=10^{35}$). In other words, there are $10^{35}$ different key conditions that could make each score table configuration. Finding which Key condition actually did make it is a search with a probability of 1 in $10^{35}$.

Summary reduction in the preferred embodiment is done by taking the numerical Sum of each bank 14 and a score table 16 of the magnitude ranking of these numerical Sums 14 is produced. In this case, the score table 16 is an arrangement of the values one through twenty-four, laid out in a table of six rows and four columns. It should be noted that these test permutations 13, (NOT P1–NOT P24), are shifted as the slides, ($P_1$–$P_{24}$), would demand but are not transposed and rotated 26, as the actual shifts would do. This incomplete process produces provisional bank ones of key values for analysis 13 that cannot appear as portions of the next key state 6 regardless of which change function 9b was actually chosen. A second table, the static real table 15, is a fixed arrangement of the same values as the score table 16, laid out with the same rows and columns. This tabular structure is chosen for convenience and could just as well be two associated lists of values. These two tables 15 & 16 are used to select a score equivalent value 17 as shown in FIG. 2. This is done using the last change function 9a from the last iteration, or if this is the first iteration, using a fixed known value 8 in place of the last change function 9a. Finding this function 9a value in the real table 15 indicates a specific row and column address. The value found at this address in the score table 16 becomes the score equivalent value 17.

As seen in FIGS. 1, 3 &4, the last section, exception shift and recording 3, is comprised of two more tables of fixed, known values from one to twenty-four, representing the slide change modes ($P_1$–$P_{24}$), the order of which is arbitrarily chosen. These tables are the input table 18 and the exit table 19 and must have the same number of rows and columns but should have their values in completely different locations from each other. These tables 18 & 19 can be arranged in any pattern of complete rows and columns. Their arrangement, in this case, six rows and four columns, defined the size of the message portion 20a that can be encrypted for each iteration. The columns of the exit table 19 represent different possible combinations of the message portion 20a. In this case, four columns denote the two bit binary combinations of 00, 01, 10 and 11 corresponding to columns one through four. Different arrangements could denote different amounts of the message per iteration such as three rows of eight columns, where the eight columns would represent the eight possible three bit binary combinations.

One encryption iteration will now be described. Turning once again to the flow chart, FIG. 1, the encryption process starts with an order of unique values defined by the secret key 10 in the current key state section 4. Value at position information 7 is conveyed to the test permutation 13 where it is re-displayed as alternative views of bank one as would be seen if each actual change function 9b was incompletely implemented. The Sum of each test permutation 14 is taken and used to construct the score table 16, a magnitude ranking of these Sums. This ranked pattern of Summed values, consistent with the described process of summary reduction, is specific to the particular state of the key 4. A known, fixed initial value 8 is used in this first iteration as the last change mode 9a thereafter, the actual last change mode 9a will be used. This last change mode 9a is used to select a score equivalent value 17 from the real table-score table arrangement 15 & 16. This score equivalent value 17 is subsequently used to find a particular position in the input table 18 and a similar position in the exit table 19 indicates the default value 23. The next two bits of the clear message 20a are used to denote a column of the exit table 19. The relative distance 24 between this column indicated by the message bits 20a and the column where the default value 23 resides is one of four values between zero and three. This distance 24 is converted to binary and written as the next ciphertext message portion 21a. The value found in the exit table 19 at the row of the default value 23 and the column indicated by the clear message portion 20a is selected to drive the next key change as the change function 9b. This function 9b defines which of the twenty-four different slide shifts ($P_1$–$P_{24}$) and the subsequent three rotation-transposition operations are actually performed on the key 4. This current iteration change function 9b is the same as the next iterations function 9a which will serve as the input to find the next arbitrary equivalent value 17 in the next iteration.

Per FIG. 5, the next key state 6 that is the result of the chosen slide change 25 and the transposition/rotation 26 indicated by the function 9b is copied into the current key state location 4 and starts a new encryption iteration. This process continues until the clear message 11 is completely processed, thoroughly altering the arrangement of values that are seen at the current key state 4 at each step. This process presents a new arrangement of key values 4 to both the key permutation section 1 and the analysis and scoring section 2 at each iteration causing a new and arbitrary score table 16 to be found for each subsequent iteration.

To decrypt a message, the same process described above is used starting from the same secret key 10 initial condition. To decrypt, the shift distance 24 represented by the ciphertext portion 21b is used to step off a distance 24 from the default value 23 found in the exit table 19, find the clear message two bit binary associated with that column 20b and write it to the plaintext file 11. The next change function 9b is found as the value 9b at that stepped off shift distance 24 from the default value 23 in the same row as the default value 23. This change function 9b is used to change the key 4 the same way as it was changed during encryption. Decryption is not encryption in reverse. Encryption and decryption both start at the same secret key state 10 and scramble the key 4 the same way, processing the plaintext 11 or ciphertext 12 from beginning to end.

The last key condition ($K_n$) 33 of the above-described process is an internal state of the cipher, not necessarily communicated to the end user. It is a procedurally conditional function of the secret key 10 ($K_0$) and is unique to the last message encoded or decoded. This feature has uses for key updating when used with the key generation scheme to be described later in this text.

It should be noted that if a guessed key, ($K_x$), different from the real key 10 used for encryption, were to be used as $K_0$ for decryption, a different arrangement of values would appear in the score table 16 and a different default value 23 would be indicated. Stepping off the relative distance 24, represented by the ciphertext portion 21b, causes the selection of a nonsensical plaintext bit packet 20b AND causes an incorrect next change function 9b to be selected. Because the score table 16, ciphertext 21b and the change function 9 are all dependent on the key condition 4, wrong guesses quickly avalanche down incorrect branches producing unenlightening gibberish as the plaintext 11. This gibberish is the product of an incorrect key condition versus those guessed key values and not the specific condition of the real key 4 values. As such this only describes a problem with that guessed condition and nothing about what the true condition or key 10 would be.

Figure 10:
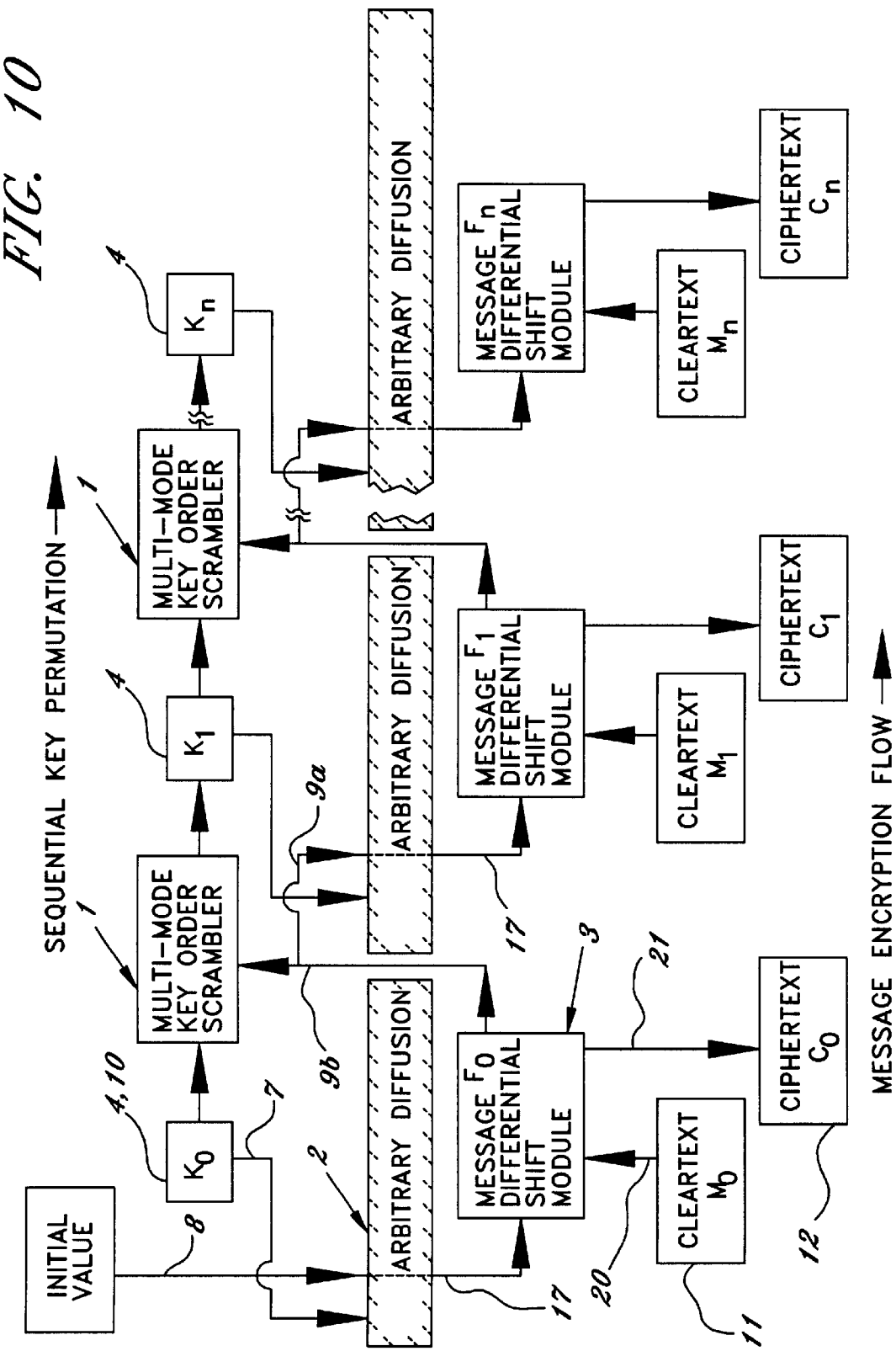
FIG. 10 is an alternate flow chart to figure one showing security.

FIG. 10 graphically illustrates the security of this method. The key scrambling method 1 and the plaintext encryption processes 3 each operate independently and only cross communicate through a screening function provided by the analysis and scoring section 2. This screening function 2 modifies an essential seed, the last change function 9a by diffuse and arbitrary aspects of the current key state to produce an arbitrary value 17 that ultimately indicates a default value 23, which is used as the relative point that the ciphertext implies a distance from. This implied, relative distance also finds the next change function 9b, which in turn selects the branch of key permutation all subsequent steps will be relative to.

Not having the key 10 but having the plaintext 11, the initial value 8 and the ciphertext 12 only eliminates those first guesses that do not conform to the information at hand. Each group of twenty-four guesses of this iterative attack eliminates 18 out of twenty-four of the possible keys. While this sounds bad, each key guess has to be tried to see if it passes or fails this test since trying a different key not only changes what gets analyzed in the score table 16, it changes the score table 16 itself. If a guessed key passes, the test is repeated on the next ciphertext portion 21b until a guessed key makes it all the way through the ciphertext without failing. This is a brute force process and is no threat since a failed guess tells an attacker nothing about what the real key looks like and has no value in improving the next guess. Completing this brute force process and finding a key that works for that plaintext/ciphertext pair does not mean that the real key has been found. Multiple guessed keys can be found that are consistent with one plaintext/ciphertext pair. These alternative keys found by guessing are not consistent with other ciphertexts made with the real key and as such will not decrypt these other ciphertexts.

Brief Description of the Block Cipher Embodiment

The stream cipher embodiment described the encrypting of two-bit binary messages. This block cipher embodiment contemplates encrypting sixty-four binary bits of plain text, illustrated at 45 in FIG. 15. As will be seen below, this encryption process is similar in most ways to the stream cipher technique described above with certain exceptions including the utilization of a sixty-four bit mask 41, also shown in FIG. 15 and the actual way in which encryption takes place and the way in which the successive pattern changing inputs starting with the second one are specifically generated.

Figure 12:
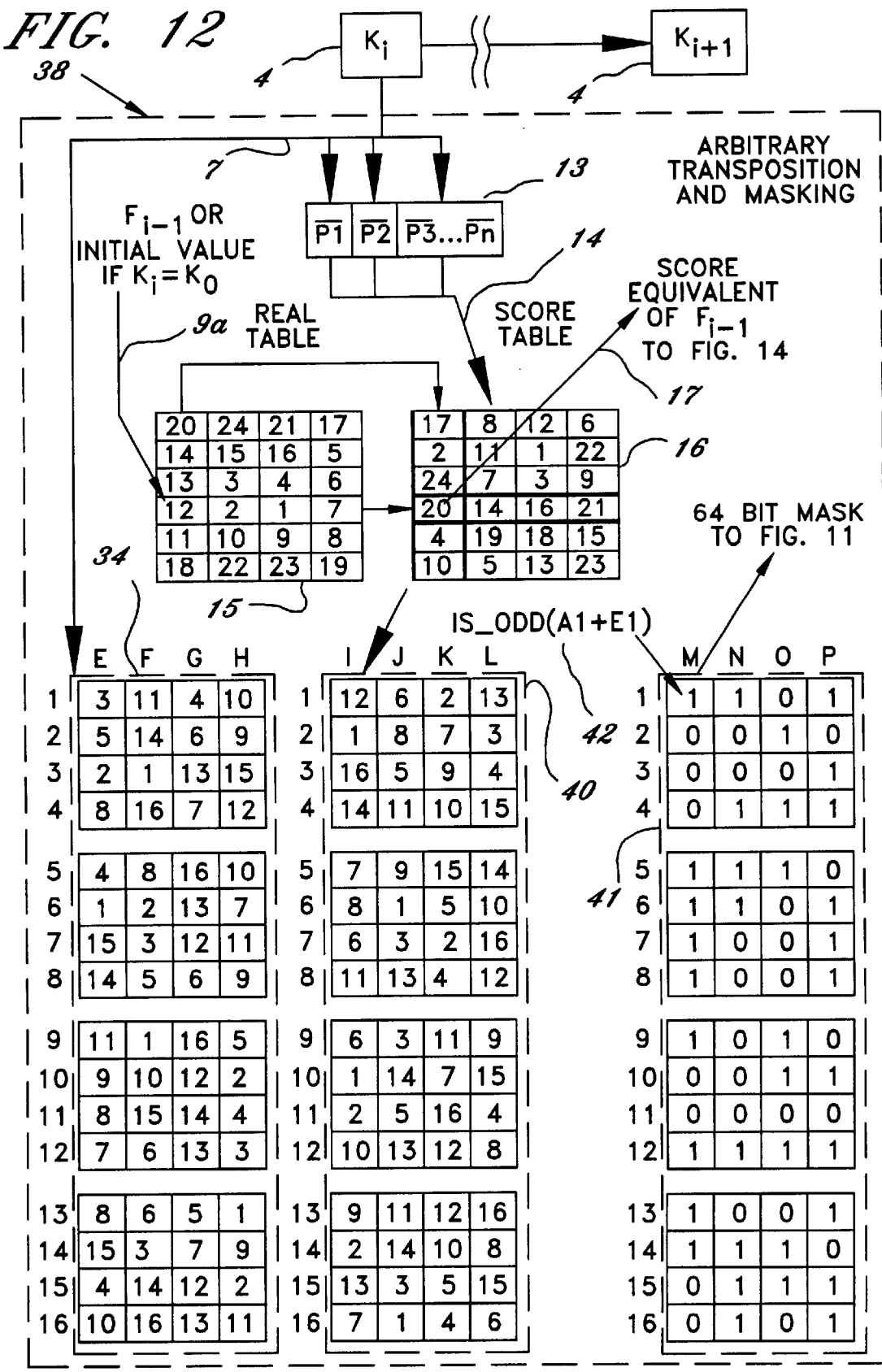
FIG. 12 is a detail of the section indicated by the reference numeral 38 of FIG. 11.
Figures 13, 14:
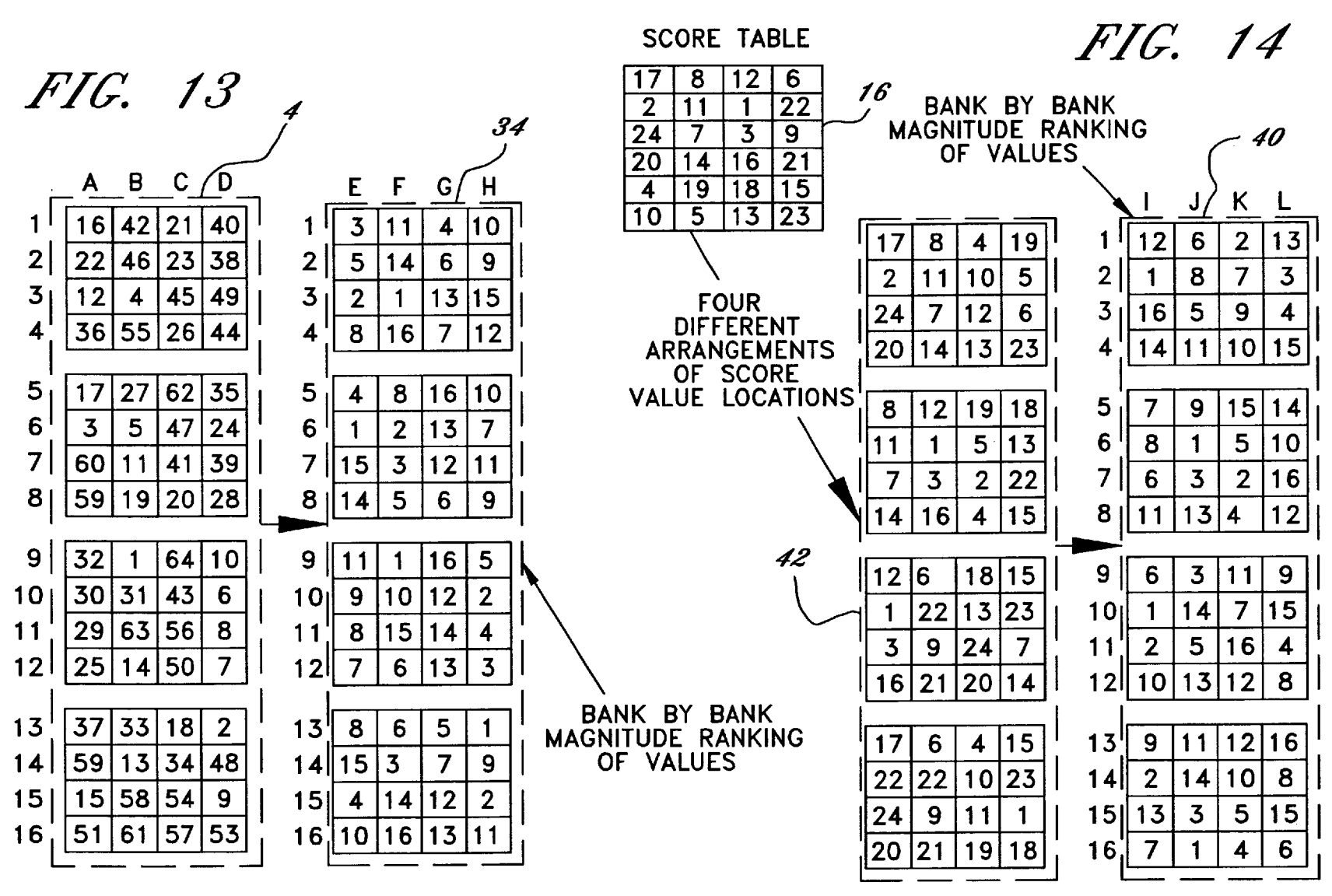

At the outset, it should be noted that this embodiment starts with the previously described arbitrary patterns $\overline{P}$, the Real Table 15 and the Score Table 16, all of which were shown in FIG. 2 and are again seen in FIG. 12. Thus, starting with the same first, key position pattern $K_i$ from FIG. 5 and the same first position pattern changing input value of twelve along with Tables 15 and 16, we obtain the same score equivalent value of twenty shown both in FIG. 2 and FIG. 12. This value will be used to obtain the second position pattern changing input to be discussed hereinafter. The Score Table itself is also used in another way. Specifically, it is used to generate the Bank by Bank Magnitude Value Ranking Table 40 shown in FIG. 14. This is accomplished by first generating Four Different Arrangements 42 of Score Value Locations, also shown in FIG. 14. The actual rank of the particular value in each of the cells of Arrangements 42 is placed in the corresponding cell of the Bank by Bank Table 10. Thus, the value 17 in the top left cell of the top Arrangement 42 is of the rank 12 in that arrangement and so the number 12 is placed in the corresponding entry in the top Bank 40 and so. At the same time, a second Bank by Bank Ranking of Values 34 shown in FIG. 13 is generated. To do this, the four banks of the current, key position pattern $K_i$ shown in FIG. 5 and again in FIG. 13, is used. The relative ranking of the values in each of the positions of these latter banks are determined and placed correspondingly into Banks 34. Thus, the value 16 at the top left position in the top bank of the pattern $K_i$ is of the rank 3 in that bank and so the number 3 is placed in the top left cell of the top Bank 34 and so on.

Figure 15:
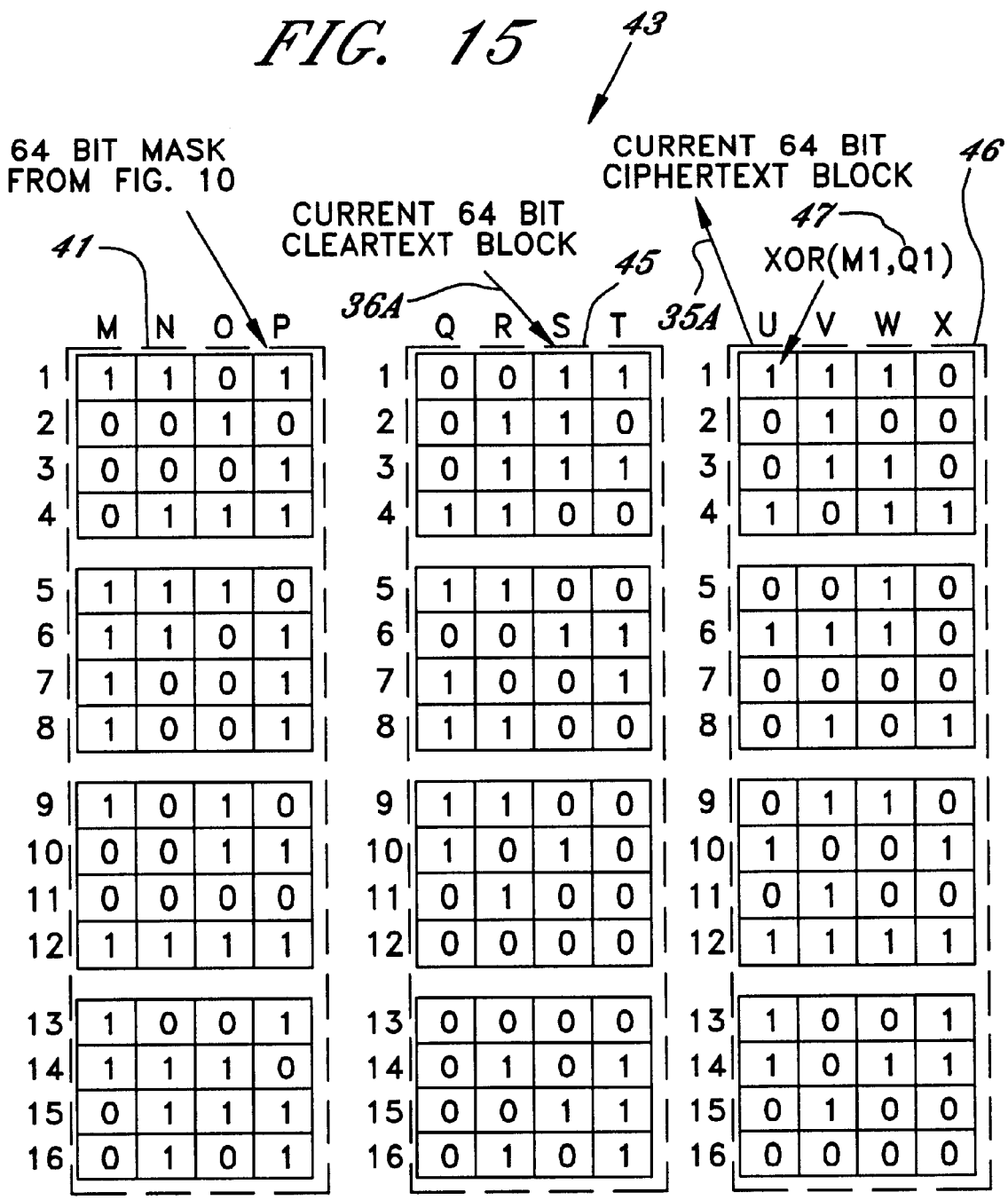
FIG. 15 is a detail of the masking portion of the section indicated by reference numeral 43 in FIG. 11.

The Bank by Bank rankings 34 and 40 are again shown in FIG. 12 and are used to generate the Mask 41 which is made up of four banks of ones and zeros. Each one and zero is based on the formula noted. Specifically, the values in corresponding cells within the Bank by Bank rankings 34 and 40 are added and if the sum odd, the value is a one and if even the value is zero. Thus, in the top left cells the values are 3+12=15=1 and so on. This Mask 41 is used with the plain text message to generate the corresponding cipher text. The plain text message, sixty-four binary bits, is shown in FIG. 15 at 45 along with Mask 41. A corresponding cell by cell comparison is made and the common Boolean function XOR is applied to the entries in the mask table and the clear text block to obtain the answer of this XOR function as the ciphertext.

The next change function is selected in a different fashion from the stream cipher since the ciphertext is generated by the mask and cannot serve as an exception report. It is still desirable that the next change function be relative to the last change function found and that it be a function of the plaintext modified by an arbitrary aspect of the key condition.

Figure 16:
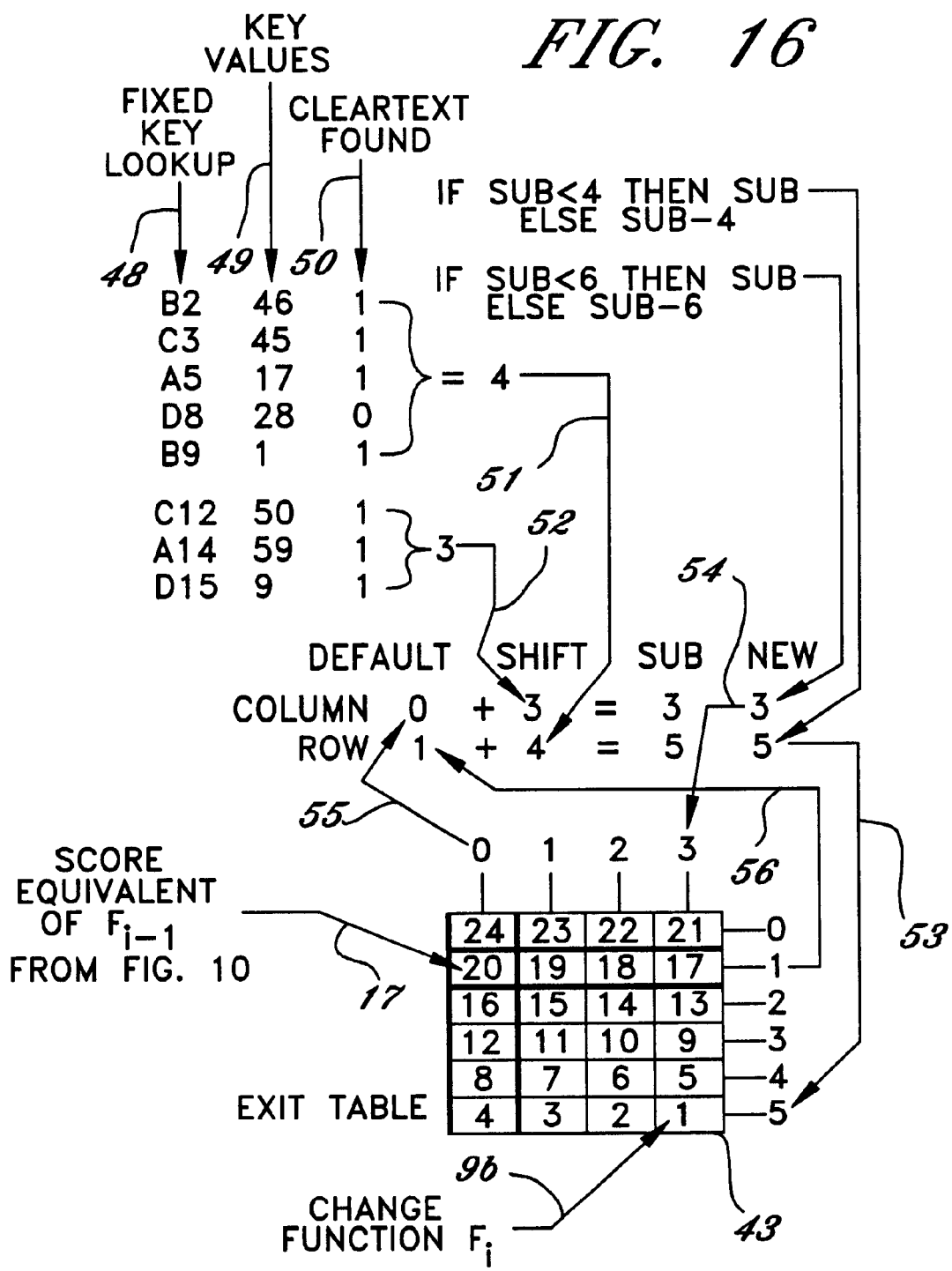
FIG. 16 is a detail of the change function portion of the section indicated by reference numeral 43 in FIG. 11.

FIG. 16 shows how this next change function is found in a way conforming to the above ideals. A default column and row 55 and 56 of the exit table 43 is found corresponding to the score equivalent of the last change function 17 (in this case, the value 20). A fixed key position list 48 returns key values 49 found at those positions in the current key configuration, $K_i$. Those key values 49 indicate positions in the current plaintext block where the bits found at those places 50 are returned and added as shown to produce column and row shift values 51 & 52. The next change function is found at the exit table 43 position indicated by this new column and row 53 & 54. As in the stream cipher, this function is used to select the actual slide move, flip and rotation performed on the current key $K_i$ to get the next key $K_{i+1}$ and is also carried forward to become the input for finding the next the next change function.

Detailed Description of the Block Cipher Embodiment

Figure 11:
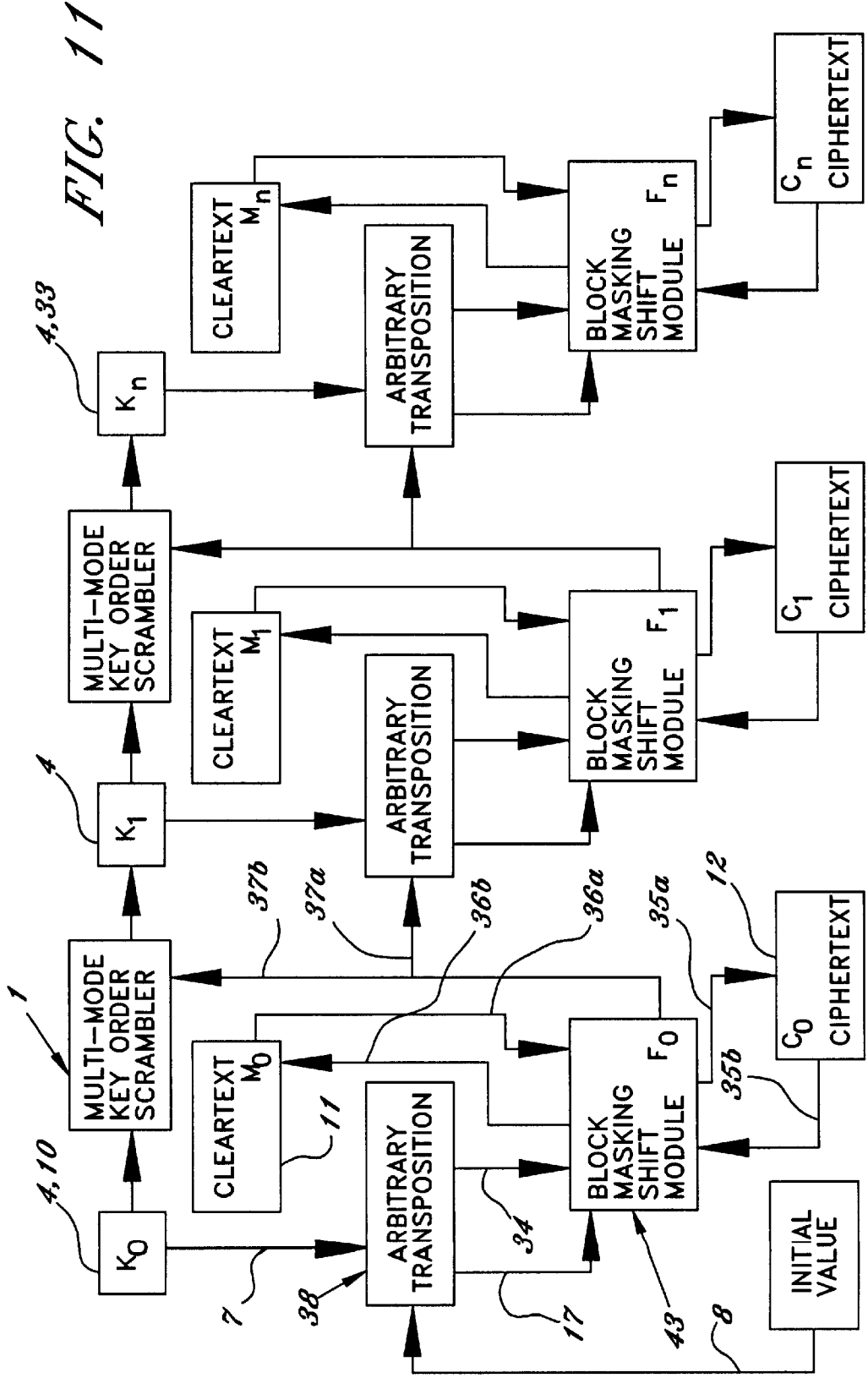
FIG. 11 is a flow chart of the block cipher embodiment general operations.

The stream cipher invention previously described can be easily modified to act upon large blocks of a plaintext to produce similar large blocks of ciphertext. The example of a block cipher that processes sixty-four bits of message for each key change iteration will be disclosed. FIG. 11 is a flow chart of one such block cipher.

The key scrambling section 1 is identical in this embodiment and will not be described again. The analysis and scoring section, was 2, now 38 is the same as in the last description in it's structure and use of summary reduction except that and additional mask table 41 is produced by a further use of summary reduction as seen in FIG. 12. This mask table 41 is generated by matrix arithmetic and a simple logical function 42, from values found in the Key ranking table 34 and the score ranking table 40. The key ranking table 34, as shown in FIG. 13, is a bank by bank ranking of the magnitude of each of the four banks of the key values 4. The score ranking table 40 is a similar magnitude ranking of different sixteen score table 16 combinations forming four banks of ranked values from the score table 16. The order of this table is an arbitrary choice. The authors' choice is found in FIG. 14, which details the construction of this table 40. A simple rule for this table 40 construction would be: All score table 16 values should be used the same number of times for all four banks but the location of values should be different in each of the four banks.

Turning now to FIG. 15, the purpose for the mask table 41 is shown. The next sixty-four bits of the plaintext message 36a is read into the clear text block 45 and exclusively OR'd with the sixty-four bits in the mask table 41 to produce the sixty-four bits of the ciphertext block 46 and thereby, the next chunk of ciphertext 35a written to file.

FIG. 16 shows the method used to determine the next key change function 9b. Simply put, the next change function 9b is determined by the position of the score equivalent value 17 in the exit table 43 shifted both row and column wise by a value of the current message block 54 constructed in response to the locations defined by specific key values 49 of the current key 4. To do this, the column number and row number of the exit table 43, indicated by the score equivalent value 17, are each added to shift values 51 & 52 to produce sub values. These sub values are then normalized to fall within the range of their respective column and row numbers of the exit table as 53 & 54 and their intersection denotes a location in the exit table where the next change function 9b is found. The shift values 51 & 52 are base-ten summations of message bits found at certain places in the current sixty-four bit message portion 36a. The actual plaintext bits 50 chosen are found according to which of the current key values 49 appear in locations of the current key 4 according to the fixed lookup address list 48. In the example shown in FIG. 14 the key values found for this iteration at the sites defined by the fixed key lookup table 48 are 46,45,17,18,1, 50,59 &9. The current plaintext sixty-four bit packet has the values 1,1,1,0,1,1,1,1 at the $46^{th}$, $45^{th}$, $17^{th}$, $18^{th}$, $1^{st}$, $50^{th}$, $59^{th}$ and $9^{th}$ places respectively and these values found are added to define the column shift value 52 (three) and the row shift value 51 (four).

One encryption iteration of the block cipher will now be described. Looking at FIG. 12, a selected secret key 10 is read into the current key state 4 and value at position information 7 about that key 4 is used to construct the test permutations 13. These test permutations 13 are then individually Summed and their magnitude ranking is used to construct the score table 16. Value at position 7 information about the key 4 is also used to construct the key ranking table 34 , FIG. 13, by doing a bank by bank magnitude ranking of the key 4 values. A similar score ranking table 40 is constructed from the values found in the score table 16 according to FIG. 14. Going back to FIG. 12, these two tables 34 and 40 are combined by a logical matrix arithmetic function 42 to produce the sixty-four bit mask 41.

For this first iteration, a known initial value 8 is used as the previous change function 9a to indicate an address in the real table 15. All subsequent iterations will use the last iteration change function 9b as the current function 9a. The address in the score table 16 corresponding to the address found in the real table 15 indicates the score equivalent value 17.

Turning now to FIG. 15, the next sixty-four bit portion 36a of the plaintext message 11 is read into the current sixty-four bit clear text block 45. This sixty-four bits of plaintext 45 is exclusively OR'd with the previously described mask 41 to produce the sixty-four bit ciphertext block which becomes the current ciphertext 35a portion recorded by suitable means to the ciphertext 12.

FIG. 16 shows the selection of the current change function 9b. The score equivalent value 17 indicates a default row and column number, 55 &56, of the exit table 43. Message bits 50 are found at locations in the 64 bit message portion 36a corresponding to the key values 49 found at the current key 4 addresses defined by the fixed key address lookup 48. These message bits found 50 are summed as shown to produce the shift values 51 & 52 which are then each added to each default column number and row number 55 &56 and each is normalized to produce the new column number and row number 52 &53, where the change function 9b can be found. This change function 9b selects the way the key 4 will be shifted and transposed as in FIG. 5 and also supplies the next value 9a, an input to the next iteration.

It is important to note that the ciphertext blocks 46 are combined with the sixty-four bit mask 41 which is an arbitrary and diffuse sixty-four bit condensation of the 384 bit key 4. Having the ciphertext 12 and the plaintext 11 allows the solution of the mask 41 but calculating the secret key 10 from the mask 41 is not possible since this type of back calculation is indeterminate. There are approximately $10^{115}$ different possible key 4 combinations and only $10^{19}$ possible mask 41 combinations. Knowing a mask 41 still leaves $10^{96}$ keys to be checked until one is found which solves the entire cipher and is therefore indicated as the true key 10. This is a computationally infeasible task.

It is also important to note that the change function 9b is found responsive to the arbitrary score table 16, the content of the message to be encoded and the current key 4 condition at each step of the process. As in the stream cipher embodiment, wrong guesses quickly avalanche down wrong branches of the possible key 4 permutation tree making information gained from one guess at one branch useless in determining the true key versus the conditions along the true branch.

Brief Description of the Initial Key (First Position Pattern) Generation

Both of the encryption processes described above assumed a starting or first, key position pattern. However, this key has to be generated in the first place. That is, for the encryption-decryption process to work both the encryptor and the decrypt or must start with the same key and must also have the same initial pattern changing input. The latter is easy to provide, it is picked at random, never changes and is known to all users. The parties need not memorize the key (which must remain secret) where, as in the present case, it is extensive (four banks of sixteen numbers) since the present invention provides for a unique method of generating the key, as will be seen below. As will also be seen, this process uses the same arbitrary pattern concept relied upon in both encryption embodiments described above.

At the outset, a secret pass phrase is selected, known only to the encryptors and decryptors, for example, "A cat" illustrated in FIG. 17 is used. Using the ANSI code and the equation shown, the truncated integer Ds is calculated. In our case it is the number 5 to be used hereinafter and at the same time, as shown in FIG. 18, the series of numbers $X_1$, $X_2$ and so on are generated. The value Kd is an input agreed upon and supplied by both encryptor and decrypt or prior to, or it is fixed in the software. It is used to set the size of the key space in other words, to set the effective key length and is actually the number of key permutations to be performed during key generation.

The value of 13 is the size chosen for the digit stream of J1 as seen in FIG. 20. This is a platform consideration and would be set in the fundamental software and remain unchanged.

Also, a known starting position pattern of specific characters is provided, that is, one that does not have to be kept secret, or it could be secret within a group of users to restrict use to that group. From this known pattern, the very same arbitrary patterns previously described are generated, Summed and ranked so as to create the same type of Score Table described before in conjunction with FIG. 2. In this case, as seen in FIG. 19, the Score Table is indicated 16 and a fixed location 63 within the Table is arbitrarily established, in this case the top right cell which displays the number 6. This latter number is used to calculate the Spi value shown in FIG. 19. The value 31 is picked heuristically as a value larger than Kd, Prime and one that makes complex digit streams.

This latter number is used in the equation of FIG. 20 to arrive at the thirteen digit number $J_1$. Note that this thirteen digit number is specific to $X_1$. As will be seen, the idea here is to generate successive pattern changing inputs which are used to move the position pattern of specific characters from pattern to pattern until the key is obtained. Each successive change is a function of: (i) the pass phrase characters via $X_1$–$X_n$, (ii) each successive key state via the value found at 63 and (iii) the pass phrase length which sets the sample increment Ds.

The number of pattern changes the key will experience is set by the input value Kd and determines the size of the possible key space that the generated key will be a member of. As such it is the variable which controls key security. In common ciphers, the key length is variable for meeting different security needs and for meeting regulatory requirements. In this method the key size must be fixed. The value Kd allows for reducing the effective key strength from the fixed size 384 bit key. At each key permutation there are 24 different change choices (slides). In this example, the key is changed 24, (Kd) times. This produces a key space size limited to $24^{24}$ possible keys (slides to the Kd power). This would be the equivalent to using a pass phrase hashed to a consistent 110 bits in a common cipher. To stay under a 56 bit key length restriction, the value used for Kd would need to be 12. $24^{12}$ is approximately $2^{56}$.

Figure 21:
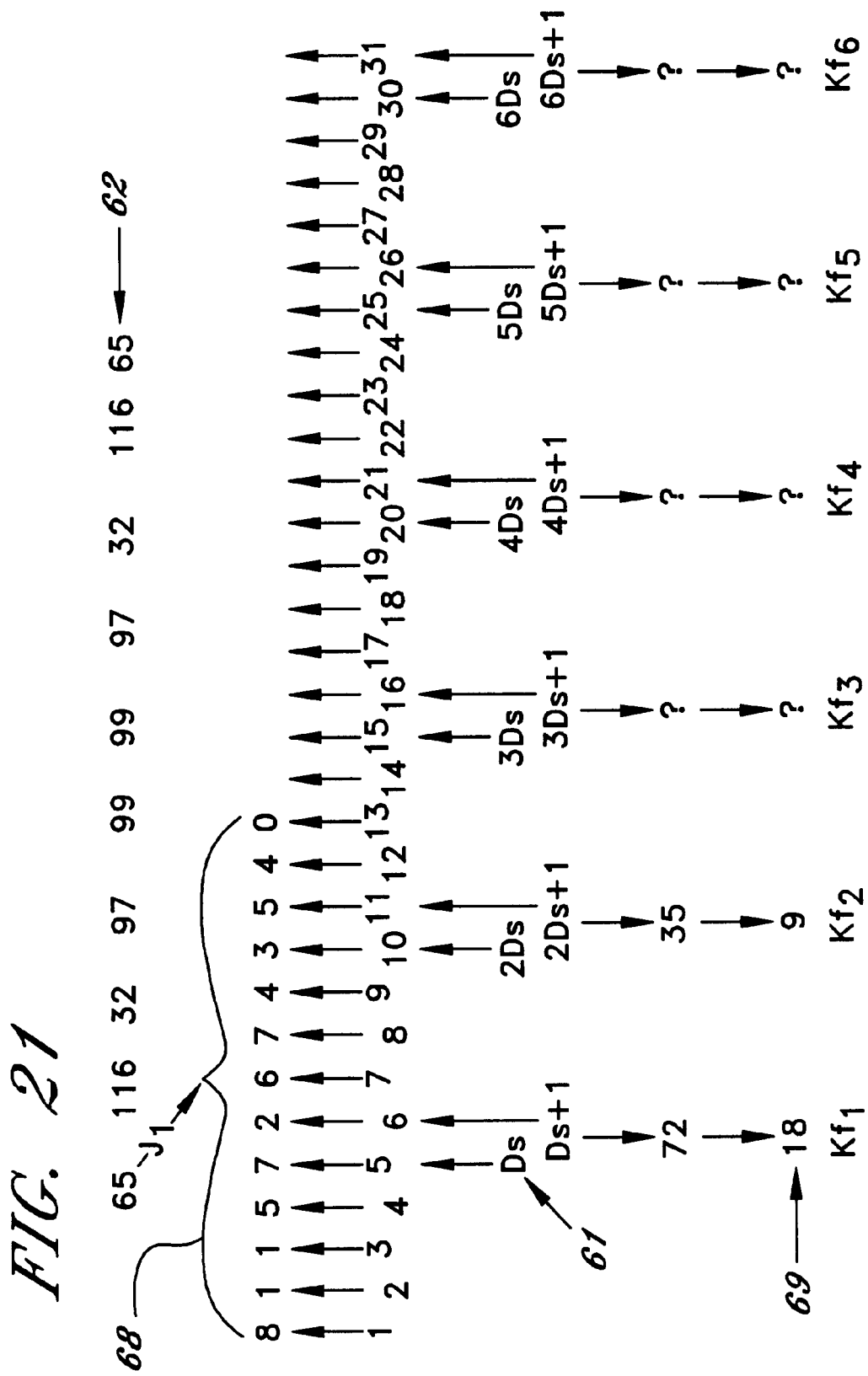
FIG. 21 is a diagram relating to the key generator showing digit sampling and change function determination.

Once $J_i$ for $X_1$ is determined, it is arranged in the manner shown in FIG. 21. Note here that the value $X_1$ is 65 from FIG. 18. At this point, Ds (the value of 5) and Ds+1 (the value of 6) are used to obtain a corresponding two digit number in $J_1$. In this case the number 72. This latter number is converted and truncated to 18 in base twenty-four and serves as the next position pattern changing function. The process is repeated with the new $K_i$ pattern obtaining a new Score Table, repeating this process as required to obtain the key.

Detail Description of Key Generation

The diffuse, stochastic key scrambling method previously described is particularly well suited to the creation of good keys. As stated before, a good key is one made by a process that distributes the keys it generates evenly over the entirety of the available key space regardless of the input used to create it. The application of this invention to key generation is as follows.

In general terms, a secret or public initial key serves as the starting point to create a large group of keys which are permutations of the initial key driven in unique and different ways dependant on a particular pass phrase. The key scrambling method used is identical to that of the stream cipher embodiment of FIG. 5. Key generation also uses the score table 16 of FIG. 2 in a way similar to that discussed before.

An example of this key generation method using the secret key 10 of FIG. 5 as the initial key and generating a different key 56 according to the pass phrase 57 will be shown starting with FIG. 17. Each character of the pass phrase 57, in this case "A cat", is converted to it's respective ANSI character code number and form the code list 59. These ANSI code numbers apply uniquely to all numbers, letters and symbols commonly used, including spacing, as input from a keyboard. The number of characters in the pass phrase 57 are counted and stored for later use as the value Pn 58. The value Pn 58 is used along with a value Kd 60 (in this case 24) to find the integer value Ds 61 which will also be used later. The numbers of the code list 59 ($A_1$ through $A_n$) are doubled and combined by the method shown in FIG. 18 to form a seed list 62 labeled $X_1$ through $X_{10}$ (in this case) also for later use.

Figure 24:
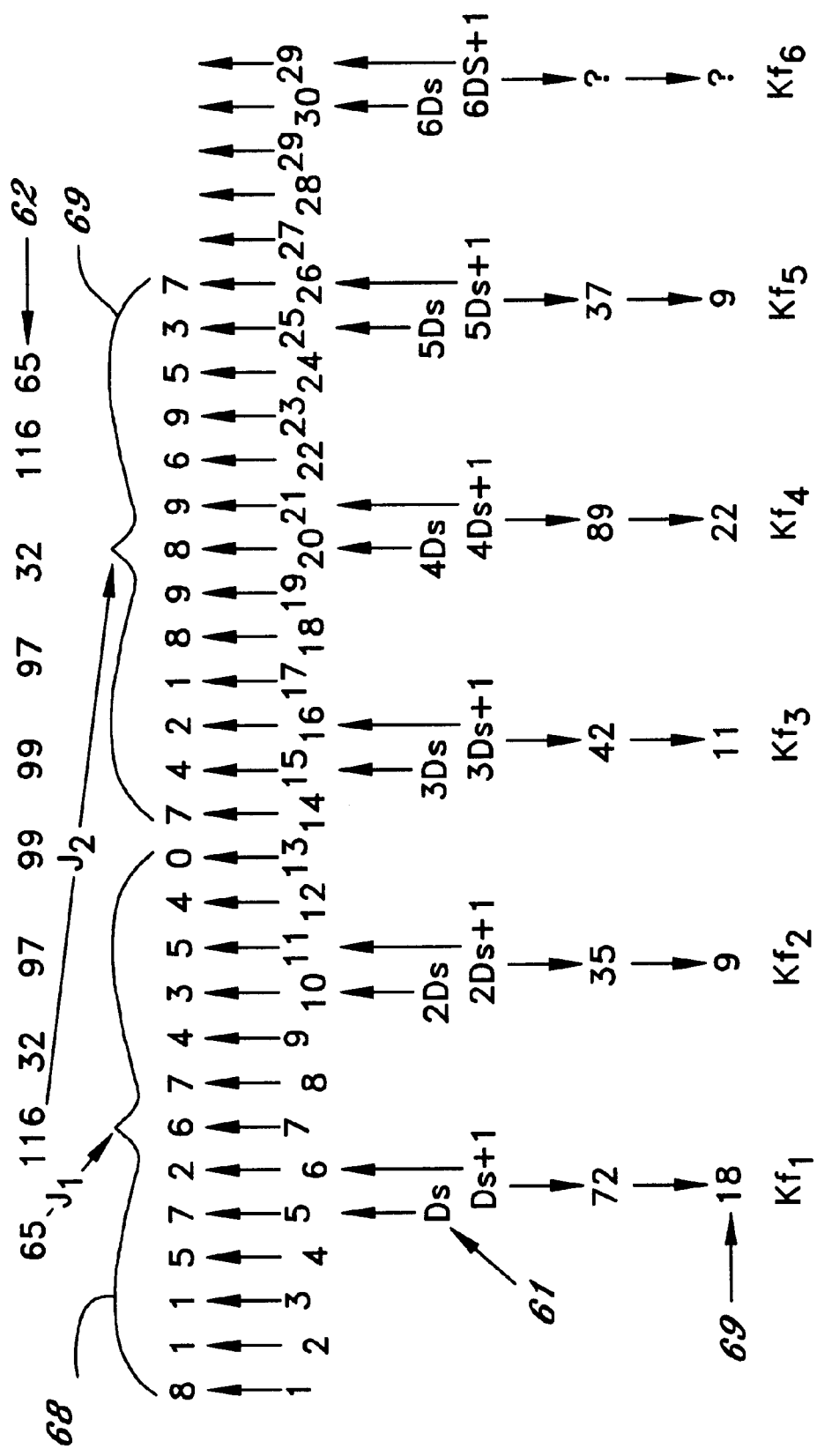
FIG. 24 is a diagram representative of FIG. 21 at a later iteration.

FIG. 19 shows the use of the previously described score table 16 in its starting condition. One arbitrarily chosen cell is used as the fixed sample location 63. The value found at this location 63 is divided by a fixed prime constant arbitrarily chosen but greater than the Kd 60 value chosen. The result of this process is the value $Sp_i$ 65 used in the next step. FIG. 20 shows the continuation of this operation where the previously determined value $Sp_i$ 65 is added to the first seed $X_1$ of the seed list 62 and that sum is multiplied by the value of π. The left thirteen places of the decimal remainder are then stored as $J_1$ 68. This $J_1$ value is then used in FIG. 21. Two digit samples of this $J_1$ 68 value are then taken at multiples of the Ds 61 value previously calculated. These two digit samples are converted from numbers zero through ninety-nine to Key change function numbers 69, one through twenty-four. These Key change function numbers 69 select that slide change and rotation transposition made to the current key 4 as seen in FIG. 5. The sample distance Ds 61, which is five in this example, provides for two key change functions ($Kf_1$ and $Kf_2$) 69. The key 4 is sequentially changed according to these two functions, $Kf_1$ and $Kf_2$. The previously described process is then repeated in FIGS. 22 and 23 using the score table 16 in its current condition (after the change functions are applied) and the next seed number 62 (in this case, $X_2$). This finds a new and different sample value 64, $Sp_i$ value 65 and ultimately a new and different value $J_2$ 69. FIG. 24 takes this $J_2$ value 69, concatenates it to the $J_1$ value 68 and continues the sample and key permutation process for the next Key change functions found (in this case, $Kf_3$, $Kf_4$ and $Kf_5$). This process continues until (the quantity represented by) Kd key permutations have been made. This produces a final key 56 which has had Kd permutations done to it (in this case 24), where each key permutation was one of twenty-four different, possible changes (P1–P24), chosen ultimately by the initial key 10 condition versus the pass phrase 57.

The example of this method using a value of twenty-four for the variable Kd 60 provides a key space of $24^{24th}$ different ending key conditions originating from the initial key condition 10, where each is substantially independent for each pass phrase 57 chosen.

Summary

The encryption method according to the present invention and as described above includes a summary reduction process. This process, as described, includes arbitrary patterns of characters which are processed to provide a score table used in the overall encryption method. It is to be understood that while arbitrary patterns (as defined heretofore) are preferable in this method, the present invention indeed contemplates the use of patterns which are not necessarily arbitrary. These non-arbitrary and arbitrary patterns may be considered generically as summary reduction patterns. Moreover, while these patterns are preferably numerically processed by means of summing to provide a reduced score table, the numerical processing thereof also contemplate averaging as well as any other means of loosing identity such as, for example, sequential XOR or Modulo division performed on the patterns of values where the remainder or XOR resultant is carried forward and the rest is discarded.

The equilateral tetrahedron disclosed herein is a visual aid to the understanding of the different functions and as a geometric guide to manipulate the matrix of values which comprise the key. There is no magic to this particular shape or its chosen subdivisions. Many different geometric patterns could be used as a guide to different ways to manipulate the matrix of key values and not avoid the uniqueness of this invention.

The disclosure of this inventive method and the embodiments disclosed has been structured to be clear and concise. Where possible, the simplest means to achieve each functional objective has been described. Applications of this method could well embody many more forms of confusion and misdirection and it is reasonable to assume that a competent cryptographer would do so. Some obvious variations are:

Key Dependent Scrambling

This invention has disclosed scrambling of the key by moving values one place along each slide. In actuality, the number of places the values of a slide could be shifted could well be a function of how various key values appear in fixed key positions at each iteration or some other arbitrary rule. Or, the labels for the various slide moves could be a function of the location of key values or the location of past score values and would then change chaotically from iteration to iteration. These rules could be applied to the true permutations chosen or to the analysis and ranking functions, or both.

At each iteration, the next change function could be modified by taking the modulo 24 remainder of multiplying the change function by a current key value retrieved from a key position selected by the modulo 64 remainder of the iteration count. This value would be used in place of the last change function 9a or the initial value 8 if this were the first iteration or finding the score equivalent value. This would assure that the permutation behavior doesn't "loop". Looping might occur if the key scrambling scheme were used only, (such as in a re-synchronizing stream application) without the divergent influence provided by B.S.E. or O.F.B. or if the nature of the plaintext were so ordered that it could not be depended upon to "Kick" the behavior out of looping if it were to occur.

Subsequent, Iterative Transposition

Different methods of scrambling or transposing of key values can be added to or used in place of the disclosed method as long as the different methods selected are repeatable. The configurations of slides ($P_1$–$P_{24}$) chosen for this disclosure are arbitrary and more or less can be constructed and used.

The examples shown above are not intended as a complete list but as an indication of the scope of the invention disclosed herein. The general functional aspects of the invention are the current key scrambling, in a branching fashion, according to arbitrary and diffuse aspects of the current key condition (Summary reduction) and the modification of that current key condition branching according to values in the plaintext, relative to arbitrary and diffuse default conditions of the current key condition.

What is claimed is:

1. A method of encrypting a data message, comprising the steps of:

(a) providing a first particular data message;

(b) selecting a first position pattern changing input;

(c) providing a first position pattern of specific characters, which first pattern serves as an encryption key for said data message, said specific characters in said first pattern being movable from said first pattern to a second one of other possible position patterns within a first group of possible second patterns;

(d) using said first position pattern, generating one or more first arbitrary patterns of characters, said one or more first arbitrary patterns being different from any one of the patterns in said first group of possible second patterns;

(e) establishing a second position pattern changing input based at least in part on (i) said first pattern changing input, (ii) said one or more first arbitrary patterns of characters, and (iii) said first message;

(f) generating a first encrypted data message corresponding to said first particular data message also based at least in part on (i) said first pattern changing input, (ii) said one or more first arbitrary patterns of characters, and (iii) said first message; and (g) placing said specific characters into a second one of the position patterns of said first group of possible second position patterns, said second position pattern being based, at least in part, on (i) said second position pattern changing input, said specific characters in said second position pattern being movable from said second pattern to a third one of other possible position patterns within a second group of possible third patterns.

2. A method according to claim 1 including the steps of:

(h) providing a second particular data message;

(i) using said second position pattern, generating one or more second arbitrary patterns of characters, said one or more second arbitrary patterns being different from any one of the patterns in said second group of possible third patterns;

(j) establishing a third position pattern changing input based at least in part on (i) said second pattern changing input, (ii) said one or more second arbitrary patterns of characters, and (iii) said second message;

(k) generating a second encrypted data message corresponding to said second particular data message based at least in part on (i) said second pattern changing input, (ii) said one or more second arbitrary patterns of characters, and (iii) said second message; and (l) placing said specific characters into a third one of the position patterns of said second group of possible third position patterns, said third position pattern being based, at least in part, on (i) said third position pattern changing input, said specific characters in said third position pattern being movable from said third pattern to a fourth one of other possible position patterns within a third group of possible fourth patterns.

3. A method according to claim 2 wherein the step (d) of generating said one or more first arbitrary patterns includes the step of (i) moving the specific characters of said first pattern in one or more different ways which cannot produce any one of the possible position patterns within said first group of possible second patterns but rather produces one or more different position patterns of said characters, which one or more different patterns serve as said one or more first arbitrary patterns.

4. A method according to claim 3 wherein said pattern changing inputs and said characters are numerical values, wherein a plurality of said first arbitrary patterns are generated and wherein said step (e) of establishing said second position pattern changing input includes the steps of:

(i) obtaining the Sum of all the numerical character values making up each of said plurality of first arbitrary patterns;

(ii) producing a scoring table based on said Sums (iii) combining said first pattern changing input and said scoring table in a way which produces a score equivalent numerical value; and (iv) combining said score equivalent numerical value with said first message in a way which produces said second position pattern changing input.

5. A method according to claim 4 wherein said step (e) (iv) of combining said score equivalent numerical value with said first message in a way which produces said second position pattern changing input includes the steps of providing an input table containing said score equivalent numerical value and an exit table containing said second position pattern changing input.

6. A method according to claim 5 wherein said first encrypted data message is generated using said exit table.

7. A method according to claim 6 wherein the step (i) of generating said one or more second arbitrary patterns includes the step of:

(i) moving the specific characters of said second pattern in one or more different ways which cannot produce any one of the possible position patterns within said second group of possible third patterns but rather produces one or more different position patterns of said characters, which one or more different patterns serve as said one or more second arbitrary patterns.

8. A method according to claim 7 wherein a plurality of said second arbitrary patterns are generated and wherein said step (j) of establishing said third position pattern changing input includes the steps of:

(i) obtaining the Sum of all the numerical character values making up each of said plurality of second arbitrary patterns;

(ii) producing a scoring table based on said last-mentioned Sums;

(iii) combining said second pattern changing input and said last-mentioned scoring table in a way which produces a score equivalent numerical value; and (iv) combining said last-mentioned score equivalent numerical value with said second message in a way which produces said third position pattern changing input.

9. A method according to claim 8 wherein said step (j) (iv) of combining said last-mentioned score equivalent numerical value with said second message in a way which produces said third position pattern changing input includes the steps of providing an input table containing said last mentioned score equivalent numerical value and an exit table containing said third position pattern changing input.

10. A method according to claim 9 wherein said second encrypted data message is generated using said last-mentioned exit table.

11. A method according to claim 2 wherein each of said groups of different position patterns is derivable from said specific characters, which characters correspond to and move in a way corresponding to like characters located within given cell positions on a number of different sides of a multi-sided member, the corresponding like characters being movable in specific different ways from their respective present cell positions to new cell positions.

12. A method according to claim 11 wherein said first position pattern of said specific characters corresponds to the corresponding like characters on a side of said multi-side member when said corresponding like characters are in said present cell positions on said side.

13. A method according to claim 12 wherein said second position pattern changing input places, said specific characters into said second one of the position patterns of said first group in a way which corresponds to causing said corresponding like characters to move from their first cell positions to specific second cell positions based on said second position pattern changing input and, thereafter, using a specific different side of said member other than said one side to correspond to said second position pattern and wherein said third position pattern changing input places said specific characters into said third one of the position patterns of said second group in a way which corresponds to causing said corresponding characters to move from their second cell positions to specific third cell positions and, thereafter, using a specific different side of said member other than said first mentioned different side to correspond to said third position pattern.

14. A method according to claim 13 wherein said multi-sided member is a four sided tetrahedron having an equal number of cells on each side thereof.

15. A method according to claim 14 wherein said characters move from cell to cell on said tetrahedron along three different groups of slide lines, each group of which extends at an angle of 60° with the other groups and each line of which extends along all four sides of said tetrahedron.

16. A method according to claim 1 wherein said messages are such that the method is carried out in a stream cipher manner.

17. A method according to claim 1 wherein said messages are such that the method is carried out in a block cipher manner.

18. A method according to claim 3 wherein said pattern changing inputs and said characters are numerical values, wherein a plurality of said first arbitrary patterns are generated and wherein said step (e) of establishing said second position pattern changing input includes the steps of:

(i) obtaining the Sum of all the numerical character values making up each of said plurality of first arbitrary patterns;

(ii) producing a scoring table based on said last-mentioned Sums;

(iii) from said last-mentioned scoring table, generating a table of values, similar in form and bank divisions to the first position pattern of characters and further modify these values by reducing them to a bank by bank relative magnitude ranking;

(iv) generating a bank by bank ranking table corresponding to and based on the numerical character values of said first position pattern;

(v) combining said ranking of score table values table and said first position pattern ranked table to produce a multi-bit binary mask (vi) providing an exit table;

(iv) combining said multi-bit mask and said first message in a way which produces a first encrypted message;

(v) using said exit table, combining said score equivalent value, indicated first position pattern values and indicated first plain message values in a way which produces said second position pattern changing input.

19. A method according to claim 1 wherein said step (c) of providing said first position pattern of specific characters includes the steps of:

(i) providing a pass phrase;

(ii) establishing a beginning pattern of specific characters, which beginning pattern is to be made known to the encryptor and decrypt or, said last-mentioned specific characters in said beginning pattern being movable from said beginning pattern to a second one of other possible position patterns within a first group of possible second patterns (iii) using said beginning position pattern, generating one or more first arbitrary patterns of characters, said one or more first arbitrary patterns being different from any one of the patterns in said last-mentioned first group of possible second patterns (iv) using said pass word and said one or more arbitrary patterns of characters, placing said specific characters from said beginning pattern into a second one of the position patterns of said last-mentioned first group of possible second position patterns, said specific characters in said second position pattern being movable from said second pattern to a third one of other possible position patterns within a second group of possible third patterns; and (v) using the last-mentioned second position patterns, repeating steps (iii) and (iv) one or more times, as desired, to establish subsequent, successive position patterns until said first pattern serving as said encryption key is provided.

20. In an overall method of encrypting segments of a data message in which there is provided (i) a first position pattern of specific characters serving as an encryption key, (ii) a second position pattern of specific characters resulting from the scrambling of the characters of the first pattern, (iii) a third position pattern of specific characters resulting from the scrambling of the characters of the second pattern and (iv) a first scrambling key for determining how said second pattern results from said first pattern, a method of generating a second scrambling key for determining how said third pattern results from said second pattern, said method comprising the steps of:

(a) using said first position pattern, generating one or more arbitrary patterns of characters in a way which insures that said one or more arbitrary patterns of characters cannot be the same as said second position pattern; and (b) combining said first pattern changing input, said one or more first arbitrary patterns of characters, and a particular segment of said message in a way which produces said second scrambling key.

21. A method according to claim 20 wherein the step (a) of generating said one or more first arbitrary patterns includes the step (i) moving the specific characters of said first pattern in one or more different ways which cannot produce said second position pattern.

22. In an overall method of encrypting segments of a data message in which a first position pattern of specific characters serving as an encryption key is provided, a method of providing said first position pattern of specific characters, comprising the steps of:

(a) providing a pass phrase;

(b) establishing a beginning pattern of specific characters, which beginning pattern is to be made known to the encryptor and decryptor, said last-mentioned specific characters in said beginning pattern being movable from said beginning pattern to a second one of other possible position patterns within a first group of possible second patterns;

(c) using said beginning position pattern, generating one or more first arbitrary patterns of characters, said one or more first arbitrary patterns being different from any one of the patterns in said last-mentioned first group of possible second patterns;

(d) using said pass word and said one or more arbitrary patterns of characters, placing said specific characters from said beginning pattern into a second one of the position patterns of said last-mentioned first group of possible second position patterns, said specific characters in said second position pattern being movable from said second pattern to a third one of other possible position patterns within a second group of possible third patterns; and (e) using the last-mentioned second position patterns, repeating steps (c) and (d) one or more times, as desired, to establish subsequent, successive position patterns until said first pattern serving as said encryption key is provided.

23. A system for encrypting a data message, comprising:

(a) means for providing a first particular data message;

(b) means for selecting a first position pattern changing input;

(c) means for providing a first position pattern of specific characters, which first pattern serves as an encryption key for said data message, said specific characters in said first pattern being movable from said first pattern to a second one of other possible position patterns within a first group of possible second patterns;

(d) means using said first position pattern for generating one or more first arbitrary patterns of characters, said one or more first arbitrary patterns being different from any one of the patterns in said first group of possible second patterns;

(e) means for establishing a second position pattern changing input based at least in part on (i) said first pattern changing input, (ii) said one or more first arbitrary patterns of characters, and (iii) said first message;

(f) means for generating a first encrypted data message corresponding to said first particular data message also based at least in part on (i) said first pattern changing input, (ii) said one or more first arbitrary patterns of characters, and (iii) said first message; and (g) means for placing said specific characters into a second one of the position patterns of said first group of possible second position patterns, said second position pattern being based, at least in part, on (i) said second position pattern changing input, said specific characters in said second position pattern being movable from said second pattern to a third one of other possible position patterns within a second group of possible third patterns.

24. In an overall system for encrypting segments of a data message in which there is provided (i) a first position pattern of specific characters serving as an encryption key, (ii) a second position pattern of specific characters resulting from the scrambling of the characters of the first pattern, (iii) a third position pattern of specific characters resulting from the scrambling of the characters of the second pattern and (iv) a first scrambling key for determining how said second pattern results from said first pattern, an arrangement for generating a second scrambling key for determining how said third pattern results from said second pattern, said method comprising:

(a) means using said first position pattern for generating one or more arbitrary patterns of characters in a way which insures that said one or more arbitrary patterns of characters cannot be the same as said second position pattern; and (b) means for combining said first pattern changing input, said one or more first arbitrary patterns of characters, and a particular segment of said message in a way which produces said second scrambling key.

25. In an overall system for encrypting segments of a data message in which a first position pattern of specific characters serving as an encryption key is provided, a method of providing said first position pattern of specific characters, comprising:

(a) means for providing a pass phrase;

(b) means for establishing a beginning pattern of specific characters, which beginning pattern is to be made known to the encryptor and decryptor, said last-mentioned specific characters in said beginning pattern being movable from said beginning pattern to a second one of other possible position patterns within a first group of possible second patterns;

(c) means using said beginning position pattern for generating one or more first arbitrary patterns of characters, said one or more first arbitrary patterns being different from any one of the patterns in said last-mentioned first group of possible second patterns (d) means using said pass word and said one or more arbitrary patterns of characters for placing said specific characters from said beginning pattern into a second one of the position patterns of said last-mentioned first group of possible second position patterns, said specific characters in said second position pattern being movable from said second pattern to a third one of other possible position patterns within a second group of possible third patterns; and (e) means using the last-mentioned second position patterns for repeating steps (c) and (d) one or more times, as desired, to establish subsequent, successive position patterns until said first pattern serving as said encryption key is provided.

26. A system for encrypting a data message, comprising:

(a) an arrangement which provides a first particular data message;

(b) an arrangement which selects a first position pattern changing input;

(c) an arrangement which provides a first position pattern of specific characters, which first pattern serves as an encryption key for said data message, said specific characters in said first pattern being movable from said first pattern to a second one of other possible position patterns within a first group of possible second patterns;

(d) an arrangement which uses said first position pattern to generate one or more first arbitrary patterns of characters, said one or more first arbitrary patterns being different from any one of the patterns in said first group of possible second patterns;

(e) an arrangement which establishes a second position pattern changing input based at least in part on (i) said first pattern changing input, (ii) said one or more first arbitrary patterns of characters, and (iii) said first message;

(f) an arrangement which generates a first encrypted data message corresponding to said first particular data message also based at least in part on (i) said first pattern changing input, (ii) said one or more first arbitrary patterns of characters, and (iii) said first message; and (g) an arrangement which places said specific characters into a second one of the position patterns of said first group of possible second position patterns, said second position pattern being based, at least in part, on (i) said second position pattern changing input, said specific characters in said second position pattern being movable from said second pattern to a third one of other possible position patterns within a second group of possible third patterns.

27. In an overall system for encrypting segments of a data message in which there is provided (i) a first position pattern of specific characters serving as an encryption function, (ii) a second position pattern of specific characters resulting from the scrambling of the characters of the first pattern, (iii) a third position pattern of specific characters resulting from the scrambling of the characters of the second pattern and (iv) a first scrambling function for determining how said second pattern results from said first pattern, an arrangement for generating a second scrambling function for determining how said third pattern results from said second pattern, said arrangement comprising:

(a) an arrangement which uses said first position pattern to generate one or more arbitrary patterns of characters in a way which insures that said one or more arbitrary patterns of characters cannot be the same as said second position pattern; and (b) an arrangement which combines said first pattern changing input, said one or more first arbitrary patterns of characters, and a particular segment of said message in a way which produces said second scrambling function.

28. In an overall system for encrypting segments of a data message in which a first position pattern of specific characters serving as an encryption key is provided, a method of providing said first position pattern of specific characters, comprising:

(a) an arrangement which provides a pass phrase;

(b) an arrangement which establishes a beginning pattern of specific characters, which beginning pattern is to be made known to the encryptor and decryptor, said last-mentioned specific characters in said beginning pattern being movable from said beginning pattern to a second one of other possible position patterns within a first group of possible second patterns;

(c) an arrangement which uses said beginning position pattern to generate one or more first arbitrary patterns of characters, said one or more first arbitrary patterns being different from any one of the patterns in said last-mentioned first group of possible second patterns (d) an arrangement which uses said pass word and said one or more arbitrary patterns of characters to place said specific characters from said beginning pattern into a second one of the position patterns of said last-mentioned first group of possible second position patterns, said specific characters in said second position pattern being movable from said second pattern to a third one of other possible position patterns within a second group of possible third patterns; and (e) an arrangement which uses the last-mentioned second position patterns to repeat steps (c) and (d) one or more times, as desired, to establish subsequent, successive position patterns until said first pattern serving as said encryption key is provided.

29. A method of encrypting a data message, comprising the steps of:

(a) providing a first particular data message;

(b) selecting a first position pattern changing input;

(c) providing a first position pattern of specific numerically related characters, which first pattern serves as an encryption key for said data message, said specific characters in said first pattern being movable from said first pattern to a second one of other possible position patterns within a first group of possible second patterns;

(d) using said first position pattern, generating a plurality of first summary reduction patterns of numerically related characters;

(e) establishing a second position pattern changing input based at least in part on (i) said first pattern changing input, (ii) said summary reduction patterns of characters, and (iii) said first message, wherein this step of establishing a second position pattern changing input includes the steps of
   (i) obtaining the sum of all the numerically related character values making up each of said plurality of summary reduction patterns;
   (ii) producing a scoring table based on said sums;
   (iii) combining said first pattern changing input and said scoring table in a way which produces a score equivalent numerical value; and
   (iv) combining said score equivalent numerical value with said first message in a way which produces said second position pattern changing input;

(f) generating a first encrypted data message corresponding to said first particular data message also based at least in part on (i) said first pattern changing input, (ii) said summary reduction patterns of characters, and (iii) said first message; and (g) placing said specific characters into a second one of the position patterns of said first group of possible second position patterns, said second position pattern being based, at least in part, on (i) said second position pattern changing input, said specific characters in said second position pattern being movable from said second pattern to a third one of other possible position patterns within a second group of possible third patterns.

30. A method of encrypting a data message, comprising the steps of:

(a) providing a first particular data message;

(b) selecting a first position pattern changing input;

(c) providing a first position pattern of specific numerically related characters, which first pattern serves as an encryption key for said data message, said specific characters in said first pattern being movable from said first pattern to a second one of other possible position patterns within a first group of possible second patterns;

(d) using said first position pattern, generating a plurality of first summary reduction patterns of numerically related characters;

(e) establishing a second position pattern changing input based at least in part on (i) said first pattern changing input, (ii) said summary reduction patterns of characters, and (iii) said first message, wherein this step of establishing a second position pattern changing input includes the steps of
   (i) numerically processing the summary reduction patterns in a way which produces a resultant scoring table;
   (ii) combining said first pattern changing input and said scoring table in a way which produces a score equivalent numerical value; and
   (iv) combining said score equivalent numerical value with said first message in a way which produces said second position pattern changing input;

(f) generating a first encrypted data message corresponding to said first particular data message also based at least in part on (i) said first pattern changing input, (ii) said summary reduction patterns of characters, and (iii) said first message; and (g) placing said specific characters into a second one of the position patterns of said first group of possible second position patterns, said second position pattern being based, at least in part, on (i) said second position pattern changing input, said specific characters in said second position pattern being movable from said second pattern to a third one of other possible position patterns within a second group of possible third patterns.

31. A method according to claim 30 wherein said numerical processing step (e)(i) includes the step of obtaining the sum of all the numerically related character values making up each of said plurality of summary reduction patterns.

32. A method according to claim 30 wherein said numerical processing step (e)(i) includes the step of obtaining the average of all the numerically related character values making up each of said plurality of summary reduction patterns.

33. In an overall method of encrypting segments of a data message in which there is provided (i) a first position pattern of specific numerically related characters serving as an encryption key, (ii) a second position pattern of specific numerically related characters resulting from the scrambling of the characters of the first pattern, (iii) a third position pattern of specific numerically related characters resulting from the scrambling of the characters of the second pattern and (iv) a first scrambling key for determining how said second pattern results from said first pattern, a method of generating a second scrambling key for determining how said third pattern results from said second pattern, said method comprising the steps of:

(a) using said first position pattern, generating a plurality of summary reduction patterns of numerically related characters; and (b) combining said first pattern changing input, said summary reduction patterns of characters, and a particular segment of said message in a way which produces said second scrambling key, wherein this latter step (b) includes the steps of
(i) numerically processing the summary reduction patterns in a way which produces a resultant scoring table;
(ii) combining said first pattern changing input and said scoring table in a way which produces a score equivalent numerical value; and
(iv) combining said score equivalent numerical value with said first message in a way which produces said second position pattern changing input.

34. In an overall method of encrypting segments of a data message in which there is provided (i) a first position pattern of specific numerically related characters serving as an encryption key, (ii) a second position pattern of specific numerically related characters resulting from the scrambling of the characters of the first pattern, (iii) a third position pattern of specific numerically related characters resulting from the scrambling of the characters of the second pattern and (iv) a first scrambling key for determining how said second pattern results from said first pattern, a method of generating a second scrambling key for determining how said third pattern results from said second pattern, said method comprising the steps of:
(a) using said first position pattern, generating a plurality of summary reduction patterns of numerically related characters; and
(b) combining said first pattern changing input, said summary reduction patterns of characters, and a particular segment of said message in a way which produces said second scrambling key, wherein this step of establishing a second position pattern changing input includes the steps of
(i) numerically processing the summary reduction patterns in a way which produces a resultant scoring table;
(ii) combining said first pattern changing input and said scoring table in a way which produces a score equivalent numerical value; and
(iv) combining said score equivalent numerical value with said first message in a way which produces said second position pattern changing input.

35. A method according to claim 34 wherein said numerical processing step includes the step of obtaining the sum of all the numerically related character values making up each of said plurality of summary reduction patterns.

36. A method according to claim 34 wherein said numerical processing step includes the step of obtaining the average of all the numerically related character values making up each of said plurality of summary reduction patterns.

37. In an overall method of encrypting segments of a data message in which there is provided a first position pattern of specific numerically related characters serving as an encryption key, the improvement comprising the use of a summary reduction process as part of said overall method, said process including the steps of:
(a) using said first position pattern, generating a plurality of summary reduction patterns of numerically related characters; and
(b) numerically processing the summary reduction patterns in a way which produces a resultant scoring table; and
(c) and using the scoring table in the overall method.

38. The improvement according to claim 9 wherein said numerical processing step includes the step of obtaining the sum of all the numerically related character values making up each of said plurality of summary reduction patterns.

39. The improvement according to claim 9 wherein said numerical processing step includes the step of obtaining the average of all the numerically related character values making up each of said plurality of summary reduction patterns.

* * * * *